United States Patent
Chuang et al.

(10) Patent No.: US 12,063,387 B2
(45) Date of Patent: Aug. 13, 2024

(54) DECODER-SIDE MOTION VECTOR RESTORATION FOR VIDEO CODING

(71) Applicant: MediaTek Inc., Hsin-Chu (TW)

(72) Inventors: Tzu-Der Chuang, Zhubei (TW); Ching-Yeh Chen, Taipei (TW)

(73) Assignee: HFI Innovation Inc., Hsinchu County (TW)

( * ) Notice: Subject to any disclaimer, the term of this patent is extended or adjusted under 35 U.S.C. 154(b) by 0 days.

(21) Appl. No.: 15/861,476

(22) Filed: Jan. 3, 2018

(65) Prior Publication Data

US 2018/0192071 A1  Jul. 5, 2018

Related U.S. Application Data

(60) Provisional application No. 62/479,350, filed on Mar. 31, 2017, provisional application No. 62/442,472, filed on Jan. 5, 2017.

(51) Int. Cl.
*H04N 19/577* (2014.01)
*H04N 19/517* (2014.01)
(Continued)

(52) U.S. Cl.
CPC ......... *H04N 19/577* (2014.11); *H04N 19/517* (2014.11); *H04N 19/527* (2014.11); *H04N 19/96* (2014.11)

(58) Field of Classification Search
CPC .... H04N 19/577; H04N 19/96; H04N 19/517; H04N 19/527
See application file for complete search history.

(56) References Cited

U.S. PATENT DOCUMENTS 9,635,386 B2 * 4/2017 Hendry .................. H04N 19/70
2003/0152149 A1 8/2003 Denolf
(Continued)

FOREIGN PATENT DOCUMENTS

CN 101415122 A 4/2009
CN 102204254 A 9/2011
(Continued)

OTHER PUBLICATIONS

International Search Report and Written Opinion for Application No. PCT/CN2018/071518 mailed Mar. 26, 2018.
(Continued)

*Primary Examiner* — Shawn S An
(74) *Attorney, Agent, or Firm* — Winston Hsu

(57) ABSTRACT

The techniques described herein relate to methods, apparatus, and computer readable media configured to determine motion vectors. The techniques relate to both encoders and decoders. For example, a decoder receives compressed video data related to a set of frames. The decoder calculates, using a decoder-side predictor refinement technique, a new motion vector for a current frame from the set of frames, wherein the new motion vector estimates motion for the current frame based on one or more reference frames. The calculation includes retrieving a first motion vector associated with the current frame, executing a first portion of the decoding process using the first motion vector, retrieving a second motion vector associated with the current frame that is different than the first motion vector, and executing a second portion of the decoding process using the second motion vector.

10 Claims, 17 Drawing Sheets

(51) Int. Cl.
*H04N 19/527* (2014.01)
*H04N 19/96* (2014.01)

(56) References Cited

U.S. PATENT DOCUMENTS

| | | | | |
|---|---|---|---|---|
| 2006/0088102 A1* | 4/2006 | Lee | ...................... | H04N 19/187 |
| | | | | 375/240.16 |
| 2006/0256866 A1 | 11/2006 | Ziauddin et al. | | |
| 2008/0043842 A1 | 2/2008 | Nakaishi | | |
| 2008/0212676 A1* | 9/2008 | Liu | ...................... | H04N 19/523 |
| | | | | 375/E7.113 |
| 2009/0238276 A1* | 9/2009 | Har-Noy | .............. | H04N 19/117 |
| | | | | 375/240.13 |
| 2010/0284464 A1 | 11/2010 | Nagori et al. | | |
| 2011/0080954 A1* | 4/2011 | Bossen | ................ | H04N 19/573 |
| | | | | 375/E7.125 |
| 2011/0176611 A1 | 7/2011 | Huang et al. | | |
| 2012/0044998 A1* | 2/2012 | Kokaram | ................ | G06T 7/215 |
| | | | | 375/E7.125 |
| 2012/0075535 A1 | 3/2012 | Van Beek | | |
| 2012/0294370 A1 | 11/2012 | Chiu et al. | | |
| 2012/0320969 A1 | 12/2012 | Zheng et al. | | |
| 2013/0022119 A1 | 1/2013 | Chien et al. | | |
| 2013/0195188 A1 | 8/2013 | Sugio et al. | | |
| 2013/0243093 A1 | 9/2013 | Chen et al. | | |
| 2014/0294097 A1* | 10/2014 | Seregin | .................. | H04N 19/31 |
| | | | | 375/240.26 |
| 2015/0022633 A1* | 1/2015 | Zhang | .................. | H04N 19/597 |
| | | | | 348/43 |
| 2015/0131739 A1* | 5/2015 | Lee | ........................ | H04N 19/44 |
| | | | | 375/240.16 |
| 2016/0012855 A1* | 1/2016 | Krishnan | ......... | H04N 21/21805 |
| | | | | 386/241 |
| 2017/0318304 A1 | 11/2017 | Sanghvi et al. | | |
| 2017/0332099 A1* | 11/2017 | Lee | ........................ | H04N 19/52 |
| 2017/0347128 A1 | 11/2017 | Panusopone et al. | | |
| 2018/0041769 A1* | 2/2018 | Chuang | ................ | H04N 19/513 |
| 2019/0037216 A1* | 1/2019 | Cho | ...................... | H04N 19/105 |
| 2019/0141334 A1* | 5/2019 | Lim | ...................... | H04N 19/117 |

FOREIGN PATENT DOCUMENTS

| | | |
|---|---|---|
| CN | 102598670 A | 7/2012 |
| CN | 102611886 A | 7/2012 |
| CN | 102710934 A | 10/2012 |
| CN | 103460695 A | 12/2013 |
| WO | WO 2012/045225 A1 | 4/2012 |
| WO | WO 2016/078511 A1 | 5/2016 |

OTHER PUBLICATIONS

Chiu et al., Decoder-side Motion Estimation and Wiener filter for HEVC. Intel Corporation. Dec. 31, 2016. 6 pages.
Qu et al., A frame rate up-conversion method with quadruple motion vector post-processing. IEEE. 2016. 1686-90.
International Search Report and Written Opinion for International Application No. PCT/CN2017/096382 mailed Oct. 27, 2017.
Alshina et al., Bi-Directional Optical Flow (JCTVC-C204). Oct. 7-15, 2010;7 pages.
Aslhina et al., Known Tools Performance Investigation for Next Generation Video Coding (VCEG-AZ05). Jun. 19-26, 2015;16 pages.
Chen et al., Algorithm Description of Joint Exploration Test Model 6 (JEM6). Joint Video Exploration Team (JVET) Document JVET-F1001. Mar. 31-Apr. 7, 2017; 49 pages.
Chen et al., Decoder-Side Motion Vector Refinement Based on Bilateral Template Matching. Joint Video Exploration Team (JVET) Document JVET-D0029. Oct. 15-Oct. 21, 2016; 4 pages.
Huang et al., A 249Mpixel/s HEVC video-decoder chip for Quad Full HD applications. Digest of Technical Papers. IEEE International Solid-State Circuits Conference (ISSCC). Feb. 2013;162-4.
Marpe et al., Context-Based Adaptive Binary Arithmetic Coding in the H.264/AVC Video Compression Standard. IEEE Transactions on Circuits and Sytems for Video Technology. Jul. 2003;13(7): 620-36.
Extended European Search Report for European Application No. 18735922.9 dated Mar. 31, 2020.
Chen et al., Algorithm Description of Joint Exploration Test Model 4. Joint Video Exploration Team (JVET) of ITU-T SG16 WP3 and ISO/IEC JTC1/SC29/WG11, 4th Meeting: Chengdu, CN, Oct. 15-21, 2016, Document JVET-D1001v1. Oct. 28, 2016;1:38 pages.
Chen et al., EE3: Decoder-Side Motion Vector Refinement Based on Bilateral Template Matching. Joint Video Exploration Team (JVET) of ITU-T SG16 WP3 and ISO/IEC JTC1/SC29/WG11, 4th Meeting: Chengdu, CN, Oct. 15-21, 2016, Document JVET-E0052. Jan. 3, 2017:4 pages.
Chiu et al., CE1: Report of self derivation of motion estimation in TMuC 0.9. Joint Collaborative Team on Video Coding (JCT-VC) of ITU-T SG16 WP3 and ISO/IEC JTC1/SC29/WG11, 4th Meeting: Daegu, KR, Jan. 20-28, 2011, Document JCTVC-D167. Jan. 16, 2011:14 pages.
Ueda, CE1: Refinement Motion Compensation using DMVD with merge extension. Joint Collaborative Team on Video Coding (JCT-VC) of ITU-T SG16 WP3 and ISO/IEC JTC1/SC29/WG11 JCT1/SC29/WG11. JCTVC-D120. Jan. 2011. 13 pages.

* cited by examiner

DECODER-SIDE MOTION VECTOR RESTORATION FOR VIDEO CODING

RELATED APPLICATIONS

This Application claims priority under 35 U.S.C. § 119(e) to U.S. Provisional Application Ser. No. 62/442,472, entitled "METHODS OF MOTION VECTOR RESTORATION FOR DECODER-SIDE PREDICTOR REFINEMENT" filed on Jan. 5, 2017, and U.S. Provisional Application Ser. No. 62/479,350, entitled "METHODS OF MOTION VECTOR RESTORATION FOR DECODER-SIDE PREDICTOR REFINEMENT" filed on Mar. 31, 2017, which are herein incorporated by reference in their entirety.

TECHNICAL FIELD

The techniques described herein relate generally to video coding, and particularly to decoder-side motion vector restoration.

BACKGROUND OF INVENTION

Video coding involves compressing (and decompressing) a digital video signal. Examples of video coding standards include the H.264 video compression standard, and its successor High Efficiency Video Coding (HEVC). Moving video is formed by taking snapshots of the signal at periodic time intervals, such that playing back the series of snapshots, or frames, produces the appearance of motion. Video encoders include a prediction model that attempts to reduce redundancy using similarities between neighboring video frames. A predicted frame is created from one or more past or future frames that are often referred to as reference frames. Frames that do not serve as reference frames are often referred to as non-reference frames.

Since each frame can include thousands or millions of pixels, video coding techniques typically do not process all of a frame's pixels at once. Therefore, a coded frame is divided into blocks that are often referred to as macroblocks. Instead of directly encoding the raw pixel values for each block, the encoder tries to find a block similar to the one it is encoding in a reference frame. If the encoder finds a similar block, the encoder can encode that block using a motion vectors, which is a two-dimensional vector that points to the matching block in the reference frame.

Some techniques explicitly signal motion information to the decoder. Examples of such modes include merge mode and advanced motion vector prediction (AMVP) mode in High Efficiency Video Coding (HEVC). However, having to signal motion vectors can consume a significant amount of data that could otherwise be used by the transmitter to encode other information. Therefore, decoder-side motion vector refinement tools can be used to refine, predict, and/or generate motion information such that the motion information can be derived without being explicitly signaled.

SUMMARY OF INVENTION

In accordance with the disclosed subject matter, apparatus, systems, and methods are provided for decoder-side motion vector restoration techniques that improve the execution speed and efficiency of decoder-side motion vector refinement techniques.

Some embodiments relate to a decoding method for decoding video data. The method includes receiving compressed video data related to a set of frames, and calculating, using a decoder-side predictor refinement technique, a new motion vector for a current frame from the set of frames, wherein the new motion vector estimates motion for the current frame based on one or more reference frames. The calculating includes retrieving a first motion vector associated with the current frame, executing a first portion of the decoding process using the first motion vector, retrieving a second motion vector associated with the current frame that is different than the first motion vector, and executing a second portion of the decoding process using the second motion vector.

In some examples, the first motion vector comprises an unrefined motion vector, the second motion vector comprises a refined motion vector, wherein the refined MV is refined using a decoder-side predictor refinement technique, the first portion of the decoding process comprises a parsing portion, a motion vector derivation portion, or both, and the second portion of the decoding process comprises a reconstruction portion.

In some examples, the decoding method includes retrieving a third motion vector associated with a second frame, wherein the third motion vector is a refined motion vector, executing the first portion of the decoding process using the first motion vector and the third motion vector, and executing the second portion of the decoding process using the second motion vector and the third motion vector.

In some examples, executing the first portion of the decoding process comprises executing a motion vector derivation portion using the first motion vector and the third motion vector, wherein the motion vector derivation portion comprises motion vector prediction derivation, merge candidate derivation, or both.

In some examples, executing the first portion of the decoding process comprises referring to the first motion vector as a decoded motion vector of the current frame.

In some examples, the decoding method includes using the second motion vector and the third motion vector to perform motion compensation, overlapped block motion compensation, deblocking, or any combination thereof.

In some examples, the decoding method includes determining a coding tree unit constraint is not applied to the compressed video data, and retrieving the first motion vector associated with the current frame includes retrieving an unrefined motion vector of the current frame, and a refined motion vector associated with a second frame.

In some examples, retrieving the first motion vector associated with the current frame includes retrieving an unrefined motion vector of a current coding tree unit row, a refined motion vector of an upper coding tree unit row, other tile, or other slice, and a refined motion vector associated with a second frame.

Some embodiments relate to a decoding method for decoding video data. The method includes receiving compressed video data related to a set of frames, and calculating, using a decoder-side predictor refinement technique, a new motion vector for a current frame from the set of frames, wherein the new motion vector estimates motion for the current frame based on one or more reference frames. The calculating includes receiving a signal indicative of a starting candidate index for a starting motion vector candidate list, determining a first motion vector candidate in the starting motion vector candidate list and a second motion vector candidate comprise a difference that is below a predetermined threshold, removing the second motion vector candidate from the starting motion vector candidate list, not adding the second motion vector candidate to the starting motion vector candidate list, or both, and calculating the new motion vector based on the candidate list and the starting candidate index.

In some examples, the decoding method includes analyzing a new motion vector candidate, the motion vector candidate comprising a motion vector pair, determining, based on the analysis, that the motion vector pair is along a same motion trajectory, and adding the motion vector pair to the starting motion vector candidate list.

In some examples, the decoding method includes analyzing a new motion vector candidate, the motion vector candidate comprising a motion vector pair, determining, based on the analysis, that the motion vector pair is not along a same motion trajectory, separating the motion vector pair into two new candidate motion vector pairs, and adding the two candidate motion vectors to the starting motion vector candidate list.

In some examples, separating includes adding the first motion vector of the motion vector pair to a first of the two new candidate motion vector pairs, filling the first of the two new candidate motion vector pairs with a mirrored motion vector of the first motion vector, adding the second motion vector of the motion vector pair to a second of the two new candidate motion vector pairs, and filling the second of the two new candidate motion vector pairs with a mirrored motion vector of the second motion vector.

Some embodiments relate to an encoding method for encoding video data. The method includes calculating compressed video data related to a set of frames, comprising calculating a new motion vector for a current frame from the set of frames, wherein the new motion vector estimates motion for the current frame based on one or more reference frames, including calculating a first motion vector associated with the current frame, executing a first portion of the encoding process using the first motion vector, calculating a second motion vector associated with the current frame that is different than the first motion vector, and executing a second portion of the encoding process using the second motion vector.

In some examples, calculating the first motion vector comprises calculating an unrefined motion vector, an unrefined motion vector set, or both, and executing the first portion of the encoding process comprises executing a syntax encoding portion, a motion vector derivation portion, a motion vector prediction derivation portion, or some combination thereof.

In some examples, executing the motion vector prediction derivation portion comprises generating a merge candidate list, generating an advanced motion vector prediction candidate list, or both.

In some examples, the encoding method includes performing motion vector encoding, motion vector prediction generation, or both, using the unrefined motion vector, the unrefined motion vector set, or both, such that the unrefined motion vector, the unrefined motion vector set, or both are not refined using a decoder-side motion vector refinement tool.

In some examples, calculating the second motion vector includes calculating a refined motion vector, wherein the refined motion vector is calculated using an encoder-side refinement technique, storing the refined motion vector in a motion vector buffer set, and executing the second portion of the encoding process comprises executing a motion compensation portion, an overlapped block motion compensation portion, a deblocking portion, or some combination thereof.

Some embodiments relate to an apparatus configured to decode video data. The apparatus includes a processor in communication with memory. The processor is configured to execute instructions stored in the memory that cause the processor to receive compressed video data related to a set of frames, and calculate, using a decoder-side predictor refinement technique, a new motion vector for a current frame from the set of frames, wherein the new motion vector estimates motion for the current frame based on one or more reference frames. The calculating includes retrieving a first motion vector associated with the current frame, executing a first portion of the decoding process using the first motion vector, retrieving a second motion vector associated with the current frame that is different than the first motion vector, and executing a second portion of the decoding process using the second motion vector.

In some examples, the first motion vector comprises an unrefined motion vector, the second motion vector comprises a refined motion vector, wherein the refined MV is refined using a decoder-side predictor refinement technique, the first portion of the decoding process comprises a parsing portion, a motion vector derivation portion, or both, and the second portion of the decoding process comprises a reconstruction portion.

In some examples, the processor is configured to execute instructions stored in the memory that cause the processor to retrieve a third motion vector associated with a second frame, wherein the third motion vector is a refined motion vector, execute the first portion of the decoding process using the first motion vector and the third motion vector, and execute the second portion of the decoding process using the second motion vector and the third motion vector.

Some embodiments relate to an apparatus configured to decode video data. The apparatus includes a processor in communication with memory. The processor is configured to execute instructions stored in the memory that cause the processor to receive compressed video data related to a set of frames, and calculate, using a decoder-side predictor refinement technique, a new motion vector for a current frame from the set of frames, wherein the new motion vector estimates motion for the current frame based on one or more reference frames. The calculating includes receiving a signal indicative of a starting candidate index for a starting motion vector candidate list, determining a first motion vector candidate in the starting motion vector candidate list and a second motion vector candidate comprise a difference that is below a predetermined threshold, removing the second motion vector candidate from the starting motion vector candidate list, not adding the second motion vector candidate to the starting motion vector candidate list, or both, and calculating the new motion vector based on the candidate list and the starting candidate index.

In some examples, the processor is configured to execute instructions stored in the memory that cause the processor to analyze a new motion vector candidate, the motion vector candidate comprising a motion vector pair, determine, based on the analysis, that the motion vector pair is along a same motion trajectory; and add the motion vector pair to the starting motion vector candidate list.

In some examples, the processor is configured to execute instructions stored in the memory that cause the processor to analyze a new motion vector candidate, the motion vector candidate comprising a motion vector pair, determine, based on the analysis, that the motion vector pair is not along a same motion trajectory, separate the motion vector pair into two new candidate motion vector pairs, and add the two candidate motion vectors to the starting motion vector candidate list.

Some embodiments relate to an apparatus configured to encode video data. The apparatus includes a processor in communication with memory. The processor being configured to execute instructions stored in the memory that cause the processor to calculate compressed video data related to a set of frames, comprising calculating a new motion vector for a current frame from the set of frames, wherein the new motion vector estimates motion for the current frame based on one or more reference frames, including calculating a first motion vector associated with the current frame, executing a first portion of the encoding process using the first motion vector, calculating a second motion vector associated with the current frame that is different than the first motion vector; and executing a second portion of the encoding process using the second motion vector.

In some examples, calculating the first motion vector includes calculating an unrefined motion vector, an unrefined motion vector set, or both, and executing the first portion of the encoding process comprises executing a syntax encoding portion, a motion vector derivation portion, a motion vector prediction derivation portion, or some combination thereof.

In some examples, calculating the second motion vector comprises calculating a refined motion vector, wherein the refined motion vector is calculated using an encoder-side refinement technique, storing the refined motion vector in a motion vector buffer set, and executing the second portion of the encoding process comprises executing a motion compensation portion, an overlapped block motion compensation portion, a deblocking portion, or some combination thereof.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION OF INVENTION

Figure 1:
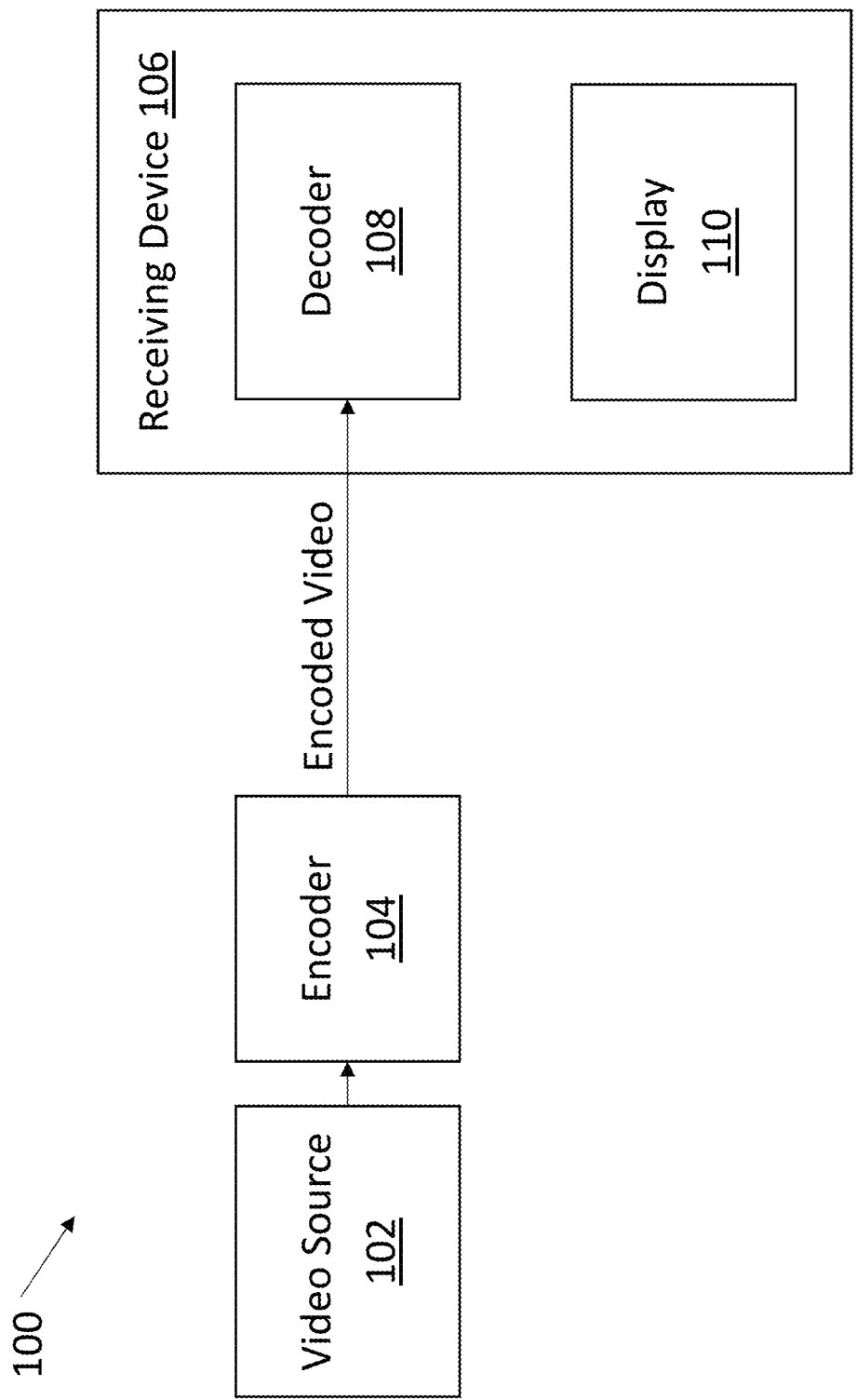
FIG. 1 shows an exemplary video coding configuration.

The inventors have recognized and appreciated that various techniques can be used to improve the execution of decoder-side predictor refinement techniques, such as pattern-based motion vector derivation (PMVD), bi-directional optical flow (BIO), and decoder-side motion vector refinement (DMVR). Decoder-side predictor refinement tools can cause processing delays due to how the motion vectors (MVs) are computed and reconstructed. Techniques can be used to allow for similar execution timing as compared to the execution of traditional decoding methods that do not predict MVs (e.g., such as when the motion vector information is signaled from the encoder). For example, a decoding process can be adjusted so that the MVs can be reconstructed early in the process, thereby allowing the decoder to pre-fetch the requisite reference pixels in a manner that hides the latency cycles required to fetch the data. As an example of such techniques, the unrefined MV can be (a) restored back into the MV buffer and/or (b) not changed, so that the unrefined MV can be used by the decoder-side MV refinement tools or used to derive the reference MV or the MV candidates (e.g. the merge candidate list and the advance motion vector predictor list) for the following blocks.

Using such techniques (e.g., restoring the unrefined MV) may, however, cause blocking artifacts and/or other coding inefficiencies. For example, in addition to using the (restored) unrefined MV for parsing, the decoder may also use the unrefined MV for deblocking, overlapped block motion compensation (OBMC), and/or temporal collocated MV derivation. The techniques described herein allow the decoder to use a different MV (e.g., other than the unrefined MV) for processing performed after the parsing stage, such as deblocking, OBMC, and/or temporal collocated MV derivation. For example, the first MV used for parsing (e.g. the MV/MVP derivation) can be an unrefined MV, and the second MV used for other processing, including deblocking, OBMC and/or temporal collocated MV derivation, can be a refined MV.

In some embodiments, the decoder uses two sets of motion vectors: the decoder uses one set of MVs for a first part of the decoding process (e.g., for parsing, including MV derivation and pixel pre-fetching), and uses the second set of MVs for a second part of the decoding process (e.g., for reconstruction, including motion compensation, OBMC and/or deblocking). In some embodiments, CTU row data is incorporated to allow additional processing with refined MVs (e.g., using refined MV of the upper CTU row). For example, the first set of MVs can include an unrefined motion vector of a current coding tree unit row, a refined motion vector of an upper coding tree unit row, and a refined motion vector associated with a second frame. The second set of MVs can include a refined MV of the current picture, and a refined MV of the other picture.

These and other techniques can allow post-parsing processing to use the refined MV to avoid additional blocking artifacts. Such techniques can provide for a higher coding gain compared to using the unrefined MV for MV processing performed after the parsing stage. These and other techniques are described further herein.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

FIG. 1 shows an exemplary video coding configuration 100, according to some embodiments. Video source 102 is a video source, and can be, for example, digital television, Internet-based video, video calling, and/or the like. Encoder 104 encodes the video source into encoded video. The encoder 104 can reside on the same device that generated the video source 102 (e.g., a cell phone, for video calling), and/or may reside on a different device. The receiving device 106 receives encoded video from the encoder 104. The receiving device 104 may receive the video as a video product (e.g., a digital video disc, or other computer readable media), through a broadcast network, through a mobile network (e.g., a cellular network), and/or through the Internet. The receiving device 106 can be, for example, a computer, a cell phone, or a television. The receiving device 106 includes a decoder 108 that is configured to decode the encoded video. The receiving device 106 also includes a display 110 for displaying the decoded video.

As explained above, part of the decoding process relies on motion vectors. In examples when the encoder (e.g., encoder 104) does not include the final MV information directly in the encoded video, the decoder (e.g., decoder 108 in the receiving device 106) can employ receiver-side prediction tools, often called receiver-side predictor refinement tools or decoder-side predictor refinement tools. An example of a receiver-side predictor refinement tool is Pattern-based Motion Vector Derivation (PMVD) mode, which may also be referred to as Frame Rate Up-Conversion (FRUC) mode. PMVD is described in, for example, Joint Video Exploration Team (JVET) Document JVET-F1001, entitled Algorithm Description of Joint Exploration Test Model 6 (JEM 6), which is hereby incorporated by reference herein in its entirety.

Other examples of decoder-side predictor refinement tools include bi-directional optical flow (BIO) and decoder-side motion vector refinement (DMVR). For example, BIO was proposed by Samsung in the third JCTVC meeting and 52th VCEG meeting, and it is disclosed in the documents, JCTVC-C204 and VECG-AZ05. See, e.g., Elena Alshina and Alexander Alshin, Bi-Directional Optical Flow, Oct. 7-15, 2010 (JCTVC-C204) (including the two attached Microsoft Excel spreadsheets), and E. Alshina et al., Known Tools Performance Investigation for Next Generation Video Coding, Jun. 19-26, 2015 (VCEG-AZ05) (including the Microsoft PowerPoint presentation), the contents of both of which are hereby incorporated by reference in their entirety. BIO utilizes the assumptions of optical flow and steady motion to achieve the sample-level motion refinement. It is typically applied only for truly bi-directional predicted blocks, which is predicted from two reference frames and one is the previous frame and the other is the latter frame. In VECG-AZ05, BIO utilizes one 5×5 window to derive the motion refinement of one sample, so for one N×N block, the motion compensated results and corresponding gradient information of one (N+4)×(N+4) block are required to derive the sample-based motion refinement of current block. And one 6-Tap gradient filter and one 6-Tap interpolation filter are used to generate the gradient information in BIO. Therefore, the computational complexity of BIO is much higher than that of traditional bi-directional prediction. For additional information, see D. Marpe, H. Schwarz, and T. Wiegand: Context-Based Adaptive Binary Arithmetic Coding in the H.264/AVC Video Compression Standard, IEEE Transactions on Circuits and Systems for Video Technology, Vol. 13, No. 7, pp. 620-636, July 2003, incorporated by reference herein in its entirety.

PMVD itself can be performed using different modes such as, for example, bi-lateral matching merge mode or template matching merge mode. Typically, which mode for the decoder to use is signaled in the encoded video. Thus the encoder signals to the decoder to use PMVD mode, and also signals which particular PMVD mode. In some examples, a FRUC_mrg_flag is signaled when the merge_flag or skip_flag is true. If the FRUC_mrg_flag is 1, then a FRUC_merge_mode is signaled to indicate whether the bilateral matching merge mode (e.g., described further in conjunction with FIGS. 2-4) or template matching merge mode (e.g., described further in conjunction with FIG. 5) is selected.

In summary, both PMVD modes use decoded pixels to derive the motion vector for the current block. A new temporal motion vector prediction (MVP) called temporal derived MVP is derived by scanning all MVs in all reference frames. A picture often refers to a number of frames (e.g., one picture includes sixteen frames). Those reference frames are put into one or two reference picture list. For P-slice, only one reference picture list is used. For the B-slice, two reference picture lists are used. Generally, for the B-slice, two reference picture lists are used to store past and future pictures, which are often referred to as LIST_0 for past pictures and LIST_1 for future pictures.

Figure 2:
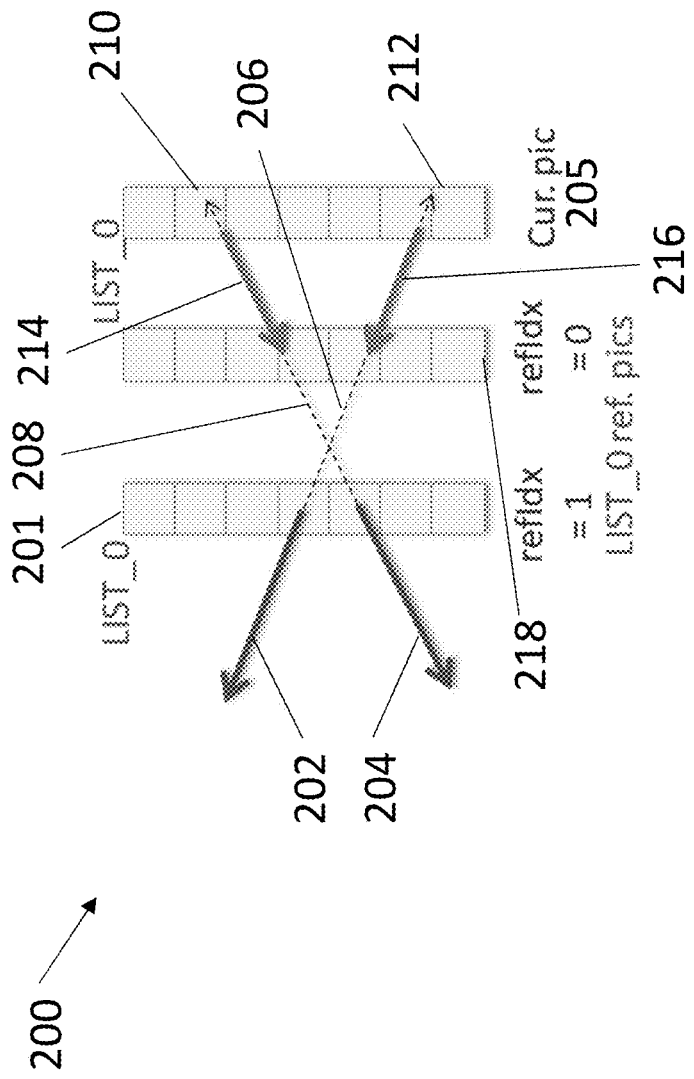
FIG. 2 shows an example technique for deriving the temporal derived motion vector predictions (MVPs).

To derive the LIST_0 temporal derived MVP, for each LIST_0 MV in the LIST_0 reference frames, the MV is scaled to point to the current frame. The block that is pointed by the scaled MV in the current frame is the target current block. The MV is further scaled to point to the reference picture for which refIdx is equal to 0 in LIST_0 for the target current block. The further scaled MV is stored in the LIST_0 MV field for the target current block. FIG. 2 shows an example 200 of deriving the temporal derived MVPs. The decoder scans all the LIST_0 MVs in LIST_0 reference pictures for which the refIdx is equal to 1. For a LIST_0 MV (shown by arrows 202, 204), a scaled MV that points to the current picture is derived for each LIST_0 MV (shown by dotted arrows 206 and 208 for reference picture 201). A 4×4 block 210, 212 in the current picture 205 is pointed to by each of the scaled MVs. Then, another scaled MV 214, 216 is assigned to the pointed 4×4 blocks 210, 212, respectively, in current picture where the scaled MV 214, 216 is along the associated scaled MV 202, 204 but the start point is the current picture 205 and the end point is the reference picture 218 with refIdx equal to 0 in LIST_0. The decoder scans all the MVs in all 4×4 blocks in all reference pictures to generate the temporal derived LIST_0 and LIST_1 MVPs of current frame. For each MV, the MV is scaled to get the crossed block in current picture. The decoder then calculates the scaled MVP and assigns it to the crossed block (as shown as the block pointed by the dotted arrows 206, 208).

Figure 3:
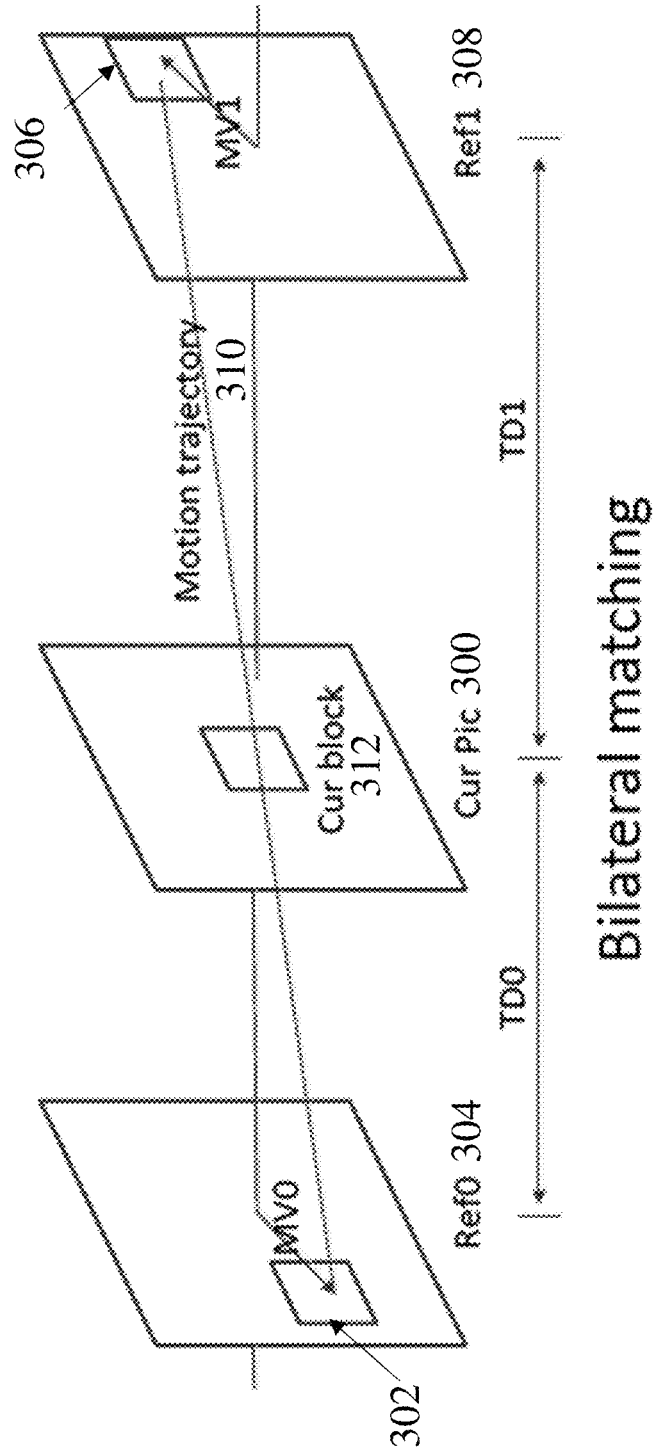
FIG. 3 shows an example technique of pattern-based motion vector derivation (PMVD) using bi-lateral matching merge mode.

FIG. 3 shows an example of PMVD bilateral matching merge mode. For bi-lateral matching, the decoder finds the two most similar reference blocks in LIST_0 and LIST_1 that lie in the same trajectory. As shown in FIG. 3, for the current picture (or "cur pic") 300 the decoder selects one macroblock (or "block") 302 in reference frame Ref0 304 from LIST_0 and a second block 306 in reference frame Ref1 308 from LIST_1. The decoder essentially assumes motion is constant, and uses the middle point of both macroblocks to generate motion trajectory 310. The decoder uses the motion trajectory 310 to find the current prediction macroblock (or "block") 312 in cur pic 300. The decoder calculates the difference between block 302 and block 306. If there is only a small difference, then the decoder knows that the blocks are very similar. In some examples, the decoder can calculate the sum of absolute distance (or "SAD") to calculate the difference between the two blocks. The decoder changes the motion trajectory to minimize the difference between the blocks.

Figure 4:
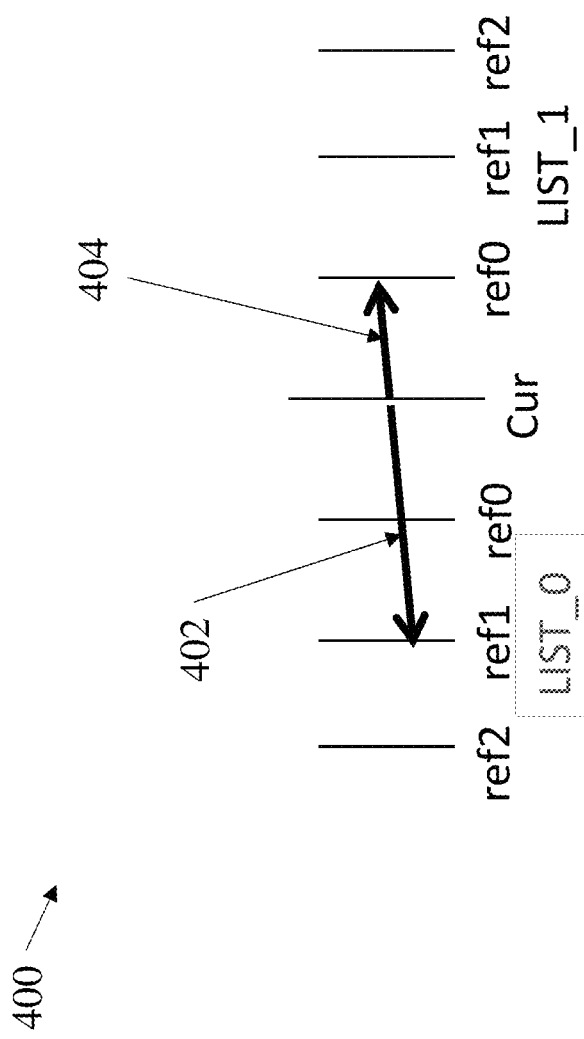
FIG. 4 shows an example of scaling a motion trajectory.

The decoder constructs the starting motion vector (MV) list in LIST_0 and LIST_1, respectively. The decoder uses eleven candidates for the list, including seven MVs of merge candidates and four temporally derived MV predictions (or MVPs). The decoder evaluates these eleven candidates to select the best starting point. In particular, the decoder searches for a pair across the two neighboring frames. When considering the candidates for each list, the decoder analyzes the 22 motion vectors to derive 22 motion vector pairs. The decoder generates the MV pairs by scaling the motion trajectory. For each MV in one list, a MV pair is generated by composing of this MV and the mirrored MV that is derived by scaling the MV to the other list. For each MV pair, two reference blocks are compensated by using this MV pair. FIG. 4 shows an example 400 of scaling a motion trajectory. In particular, the motion trajectory 402 from the Cur pic to ref1 in LIST_0 is scaled as shown with motion trajectory 404 from Cur pic to ref0 in LIST_1. The decoder calculates a cost for each of the 22 motion vector pairs (e.g., using SAD) and selects the MV pair with the smallest cost as the starting point of bilateral matching merge mode.

The decoder next refines the selected MV pair. The decoder searches different blocks around the starting point to decide which block is the best match. In some examples, the current PU is divided into sub-PUs. The depth of sub-PU is signaled in sequence parameter set, SPS (e.g. 3). In some examples, the minimum sub-PU size is a 4×4 block. For each sub-PU, several starting MVs in LIST_0 and LIST_1 are selected, which includes MVs of PU-level derived MV, zero MV, HEVC collocated TMVP of current sub-PU and bottom-right block, temporal derived MVP of current sub-PU, and MVs of left and above PUs/sub-PUs. By using the similar mechanism in PU-level searching, the best MV pair for the sub-PU is selected. In some examples, the decoder uses a Diamond Search algorithm to search the different blocks. Then the final MV pair is used as the PU-level and sub-PU-level best MV pair.

In summary, in some examples the bilateral matching merge mode uses the MV lists first, evaluates the candidate MV pairs to get starting MV pair, and then refines the pair to determine the ultimate best MV pair.

Figure 5:
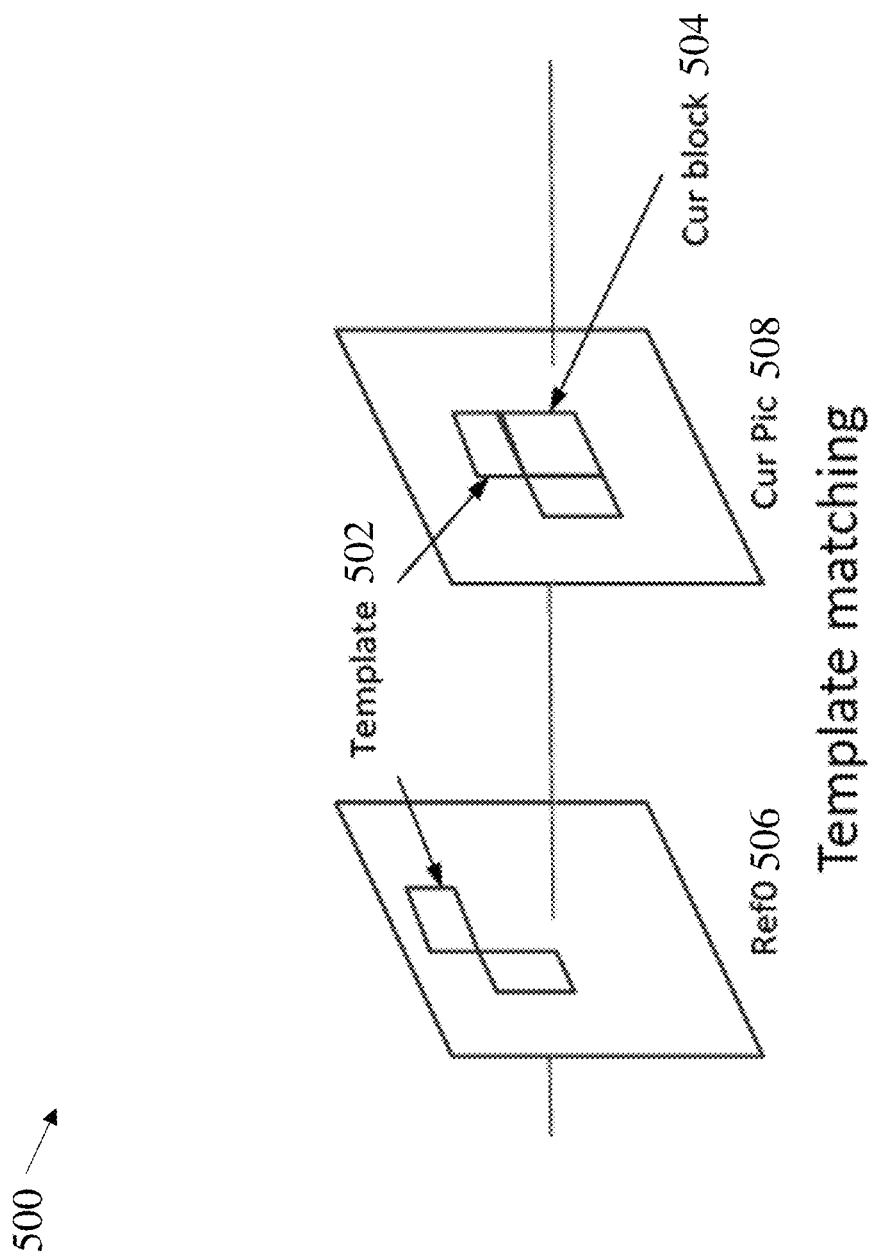
FIG. 5 shows an example technique of pattern-based motion vector derivation (PMVD) using template matching merge mode.

For template matching merge mode, the assumption is that for the decoder to decode the current block, the decoder can use the neighboring block using a template to find a best match. So the decoder can use the neighboring block to find a best match, and then uses the best match motion vector. FIG. 5 shows an example technique for template matching merge mode. Referring to FIG. 5, the template 502 includes the reconstructed pixels from four rows above the current block 504 and from four columns to the left of the current block 504 to perform the matching in Ref 0 506 for Cur Pic 508. Therefore, unlike bilateral matching merge mode, template matching merge mode does not use two reference frames—it just uses one reference frame.

Like bilateral matching merge mode, two-stage matching is also applied for template matching. In the PU-level matching, eleven starting MVs in LIST_0 and LIST_1 are selected respectively. These MVs include seven MVs from merge candidates and four MVs from temporal derived MVPs. Two different staring MV sets are generated for two lists. For each MV in one list, the SAD cost of the template with the MV is calculated. The MV with the smallest cost is the best MV. Then, the diamond search is performed to refine the MV. The refinement precision is ⅛-pel. The refinement search range is restricted within ±8 pixels. The final MV is the PU-level derived MV. The MVs in LIST_0 and LIST_1 are generated independently.

For the second stage, sub-PU-level searching, the current PU is divided into sub-PUs. The depth of sub-PU is signaled in SPS (e.g. 3). Minimum sub-PU size is 4×4 block. For each sub-PU at left or top PU boundaries, several starting MVs in LIST_0 and LIST_1 are selected, which includes MVs of PU-level derived MV, zero MV, HEVC collocated TMVP of current sub-PU and bottom-right block, temporal derived MVP of current sub-PU, and MVs of left and above PUs/sub-PUs. By using the similar mechanism in PU-level searching, the best MV pair for the sub-PU is selected. The diamond search is performed to refine the MV pair. The motion compensation for this sub-PU is performed to generate the predictor for this sub-PU. For those PUs which are not at left or top PU boundaries, the second stage, sub-PU-level searching, is not applied, and the corresponding MVs are set equal to the MVs in the first stage.

Figure 9:
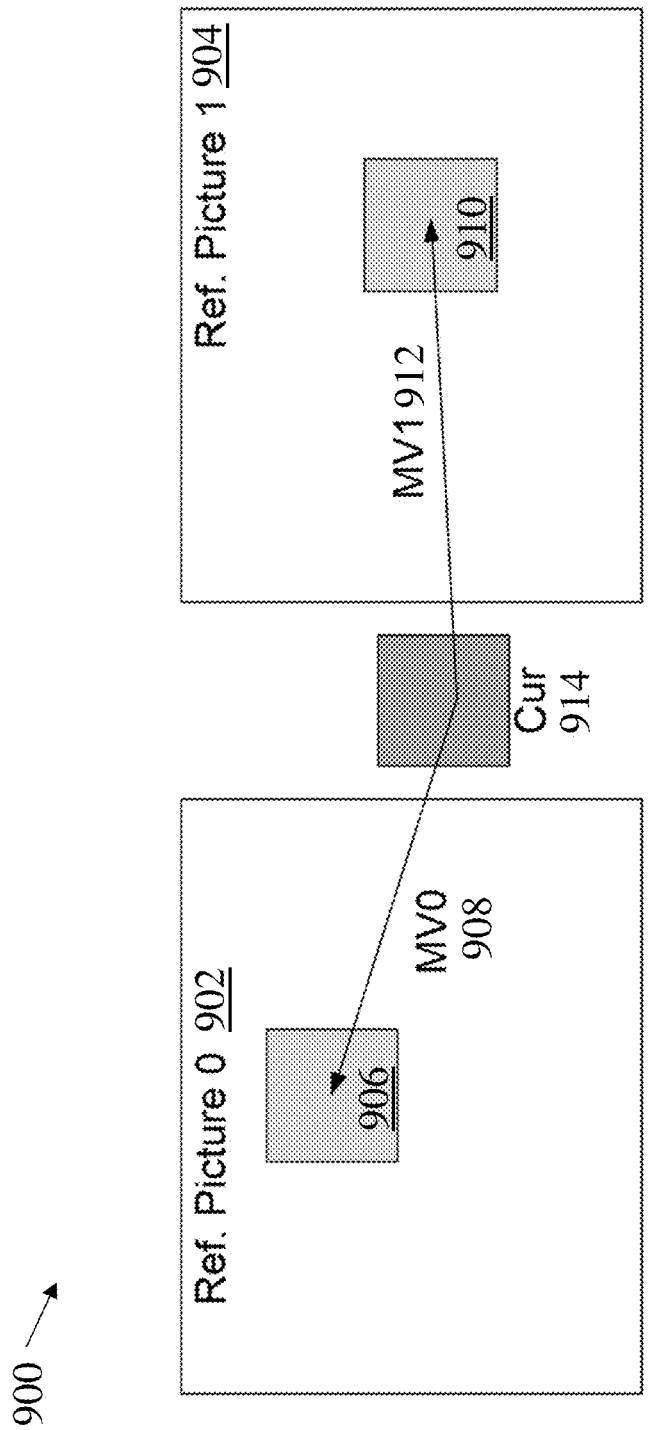
FIG. 9 shows an example of a decoder-side MV refinement (DMVR) process that uses two reference pictures.

When a bi-prediction MV pair is signaled (e.g. for merge mode, when selecting a bi-predicted merge candidate), a decoder-side MV refinement (DMVR) process can be performed to refine the LIST_0 and LIST_1 MVs for better coding efficiency. An example of the DMVR process was proposed by HiSilicon in JVET-D0029, entitled "Decoder-Side Motion Vector Refinement Based on Bilateral Template Matching," which is hereby incorporated by reference herein in its entirety. FIG. 9 shows a DMVR process 900 that uses reference picture 0 902 and reference picture 1 904, according to some examples. In the DMVR process 900, a bi-predicted block (the Bi-predicted template) is generated by using the bi-prediction from the reference block 906 of MV0 908 and the reference block 910 of MV1 912. The bi-predicted block is used as a new current block Cur' (in place of the original current block 914) to perform motion estimation to search for a better matching block in Ref. Picture 0 902 and Ref. Picture 1 904, respectively. The refined MVs (MV0' and MV1', not shown in FIG. 9) are used to generate a final bi-predicted prediction block for the current block.

Figure 10:
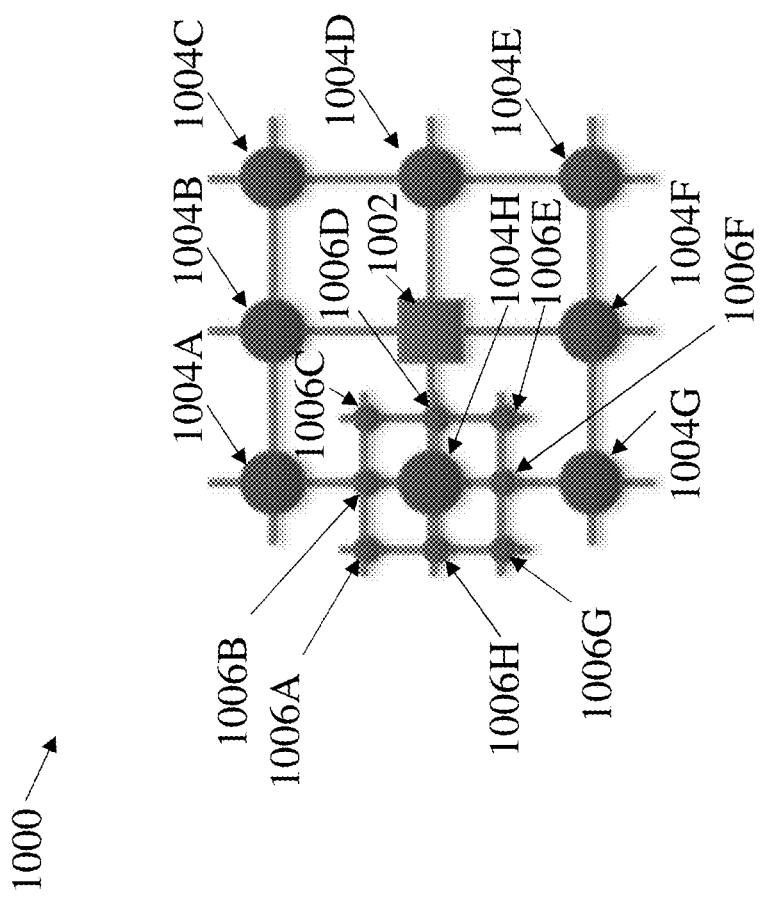
FIG. 10 shows an exemplary two-stage search process to search for a new (e.g., better) matching block using the bi-predicted block.

In some embodiments, DMVR uses a two-stage search to refine the MVs of the current block to generate MV0' and MV1'. FIG. 10 shows an exemplary two-stage search process 1000 to search for a new (e.g., better) matching block using the bi-predicted block, according to some embodiments. As shown in FIG. 10, for a current block in Ref. Picture 0, the cost of current MV candidate is first evaluated at the square block 1002 (also referred to as L0_pred). For example, the cost of block 1002 can be calculated as the sum of absolute difference (SAD) of (Cur'—L0_pred) to calculate the initial cost. In the first stage of the search, an integer-pixel square search is performed around block 1002. As shown in this example, eight candidates (the eight large circles 1004A-1004H in FIG. 10, collectively referred to as 1004) are evaluated. The distance between two adjacent circles (e.g., 1004A and 1004B), and the distance between the square block 1002 and the adjacent circle (e.g., 1004B) is one pixel. An 8-tap filter can be used to generate the eight candidate blocks for each of the blocks 1004, and the cost of each candidate can be evaluated using SAD. The candidate of the eight candidates 1004 with the best cost (e.g., the lowest cost, if using SAD) is selected as the best MV candidate in the first stage, shown as 1004H in this example. In the second stage, a half-pixel square search is performed around the best MV candidate (1004H, in this example) from the first stage, as shown as eight small circles 1006A-1006H (collectively half-pixels 1006). An 8-tap filter can also be used to generate a candidate block for each of the half-pixels 1006), and the cost can be determined using SAD. The MV candidate with the best cost (e.g., lowest cost) is selected as the final MV that is used for final motion compensation. The process is repeated for Ref. Picture 1 904 to determine the final MV for Ref. Picture 1. The final bi-predicted block is regenerated using the refined MVs.

Figure 6:
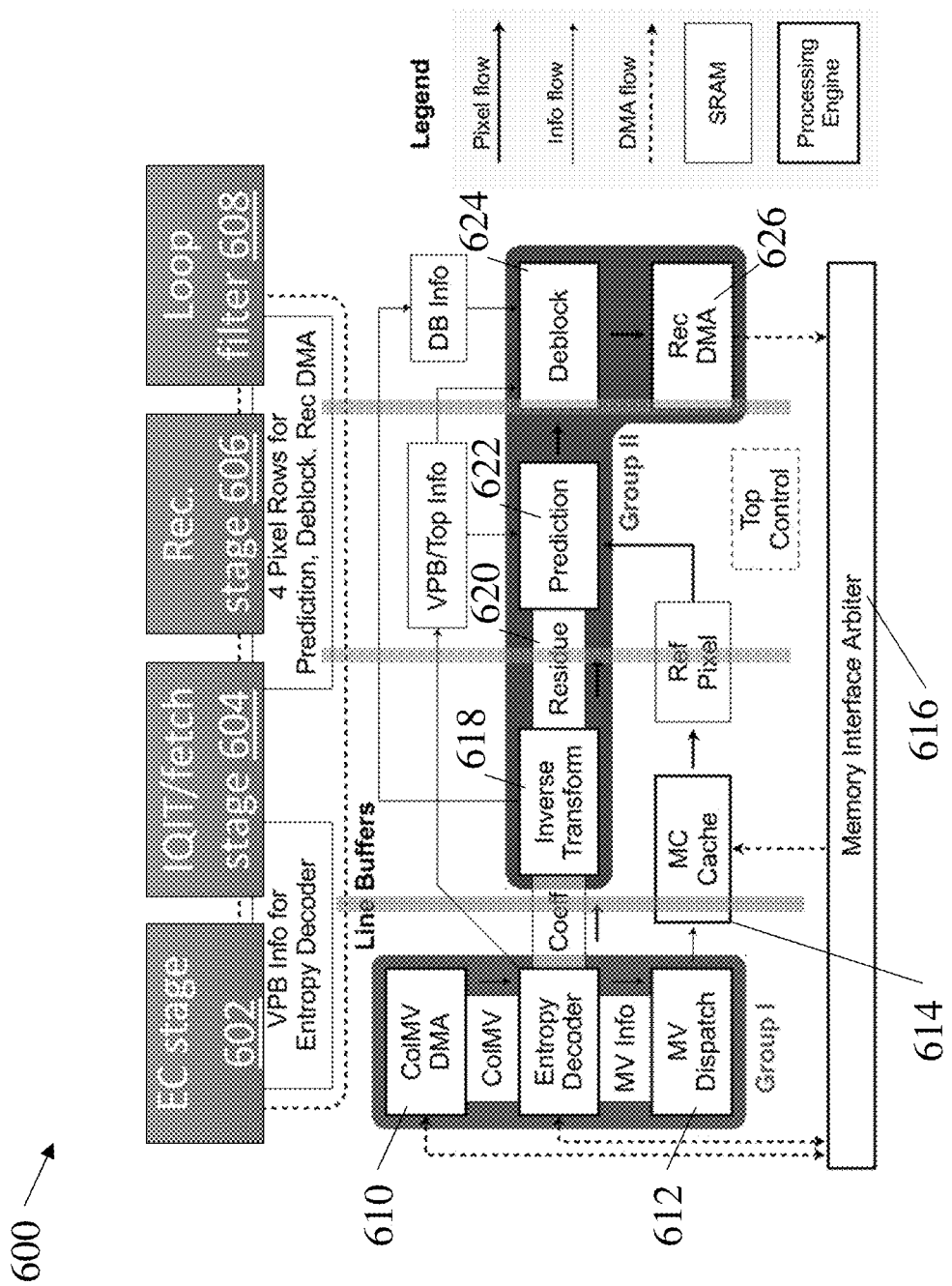
FIG. 6 shows an exemplary decoder architecture.

FIG. 6 shows an exemplary decoder architecture 600, according to some embodiments. The Entropy Decoder includes, e.g., a CABAC or CAVLC entropy decoder, which parses the syntaxes from the bitstream. The ColMV DMA 610 stores the collocated temporal MVs. The MV Dispatch 612 reconstructs the MVs of the blocks and issues the memory fetch instruction to the MC cache 614 and DRAM (not shown) through the memory interface arbiter 616. The Inverse Transform 618 includes inverse quantization and inverse transform (IQIT) that generates the reconstructed residual 620. Prediction block 622 generates the inter motion compensation and intra prediction predictors. Deblock 624 is to reduce the block artifact and the Rec DMA 626 stores the reconstructed pixels to the external DRAM. Further detail of exemplary components of this architecture is discussed in C.-T. Huang et al., "A 249 MPixel/s HEVC video-decoder chip for Quad Full HD applications," Digest of Technical Papers IEEE International Solid-State Circuits Conference (ISSCC), pp. 162-163, February 2013, which is hereby incorporated by reference herein in its entirety. Of note, the architecture is broken up into four stages in order to pipeline the architecture: the EC stage 602, the IQIT (inverse quantization and inverse transform)/fetch stage 604, the reconstruction stage 606 and the loop filter stage 608. In HEVC and H.264, the final MV can be derived in both the EC stage 602 (which includes parsing) and the reconstruction stage 606. In some implementations, the decoder derives the final MV in the parsing stage, and pre-fetches the required reference pixel data in the parsing stage (EC stage 602). This can be done, for example, to reduce/hide the DRAM access time.

Figure 7:
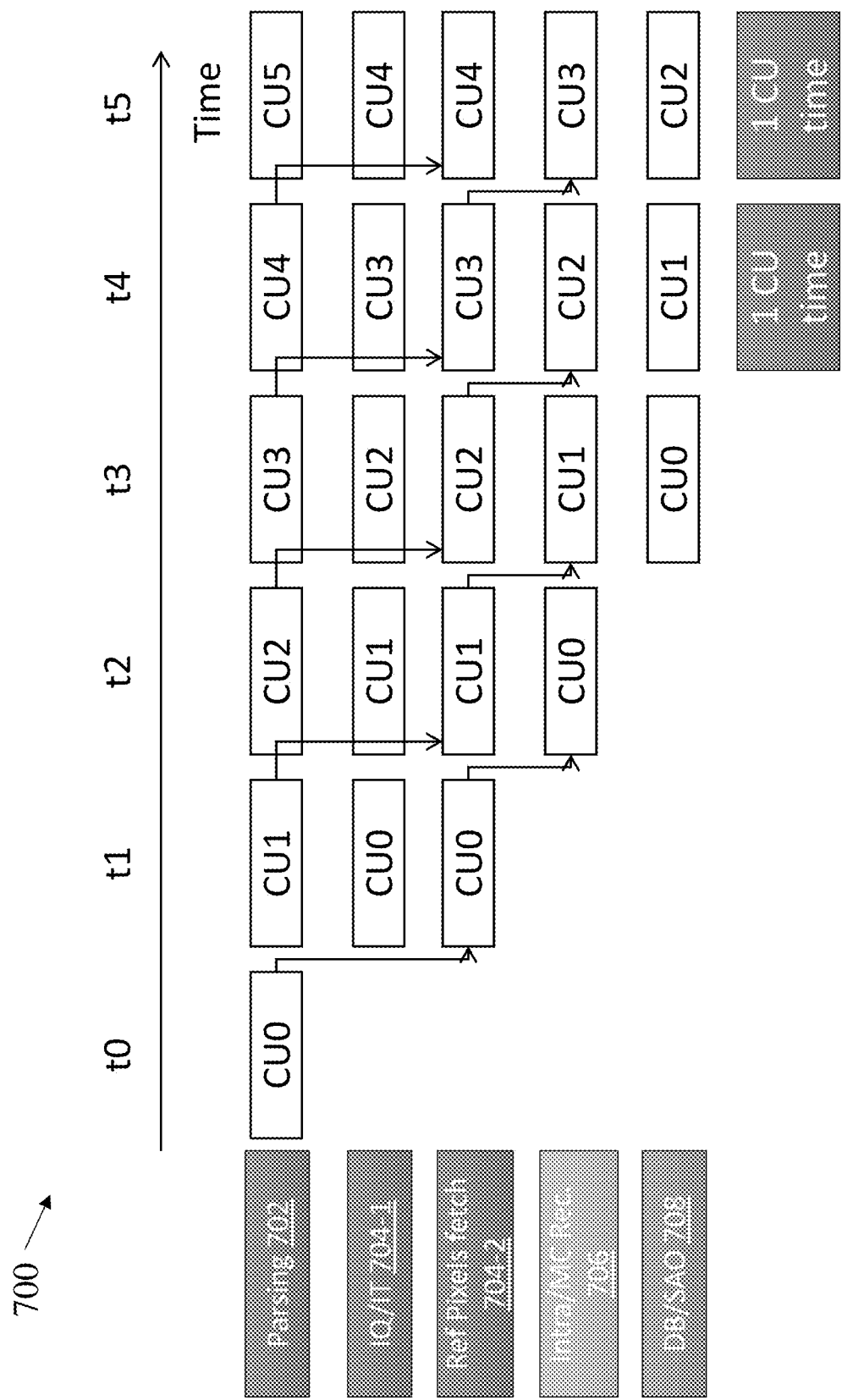
FIG. 7 shows an example of a decoder pipeline execution when executing a decoder architecture, such as the decoder architecture shown in FIG. 6.

FIG. 7 shows an example of a decoder pipeline execution 700 when executing a decoder architecture, such as the decoder architecture shown in FIG. 6, according to some embodiments. FIG. 7 includes the parsing stage 702, during which the motion vectors are reconstructed as described above. The IQ/IT stage 704-1 generates the reconstructed residual for the current block. The Reference Pixels Fetch stage 704-2 fetches reference pixel data from memory. Reference frames are often stored in external memory, such as DRAM. Thus, if the decoder wants to do motion compensation on a reference frame, the decoder first needs to go to external memory to retrieve the reference data. Typically a lot of latency time is required to get data from external memory. The Intra/MC (Motion Compensation) reconstruction stage 706 performs the prediction. The deblocking (DB)/Sample Adaptive Offset (SAO) stage 708 performs in-loop filtering process to improve the quality of the decoded frame.

Generally, the decoder first decodes CU0, then CU1 and so forth. To give an example using CU0, at t0, the decoder decodes CU0 in the parsing stage 702 including reconstructing the MVs. Then, at t1 CU0 moves to IQ/IT stage 704-1. In order to do motion compensation in the Intra/MC Reconstruction stage 706, the decoder needs to do a pre-fetch in the previous stage (the Ref Pixels fetch stage 704-2).

As can be seen in FIG. 7, in order to hide the delay time to fetch data from memory (e.g., so it does not affect the pipeline execution), since the decoder needs to know the motion vector prior to reconstruction performed in the Intra/MC Reconstruction stage 706, the data is pre-fetched in the Ref Pixels fetch stage 704-2 and stored in local memory (e.g., SRAM or cache memory). For example, in the MPEG-2/4, H.264/AVC, and HEVC video decoder, the MVs can be reconstructed in the parsing stage. According to the reconstructed MVs, the required reference pixels can be fetched from the DRAM and stored in the local memory, e.g. SRAM or cache memory. In the Intra/MC Reconstruction stage 706, the reference data can be loaded from the local memory without latency cycles.

However, decoder-side predictor refinement tools use the neighboring block(s) to derive the motion vector (e.g., PMVD, such as how template matching merge mode uses the neighboring block to derive motion vector). However, the template block is not generated until the third stage (the Intra/MC Reconstruction stage 706). For example, when PMVD is applied, the final MVs of a PMVD coded block depend on the PMVD searching process in the Intra/MC Reconstruction stage 706, which means the MVs cannot be reconstructed in the Parsing stage 702, and therefore the data pre-fetch is not feasible at stage Ref Pixels fetch 704-2.

Figure 8:
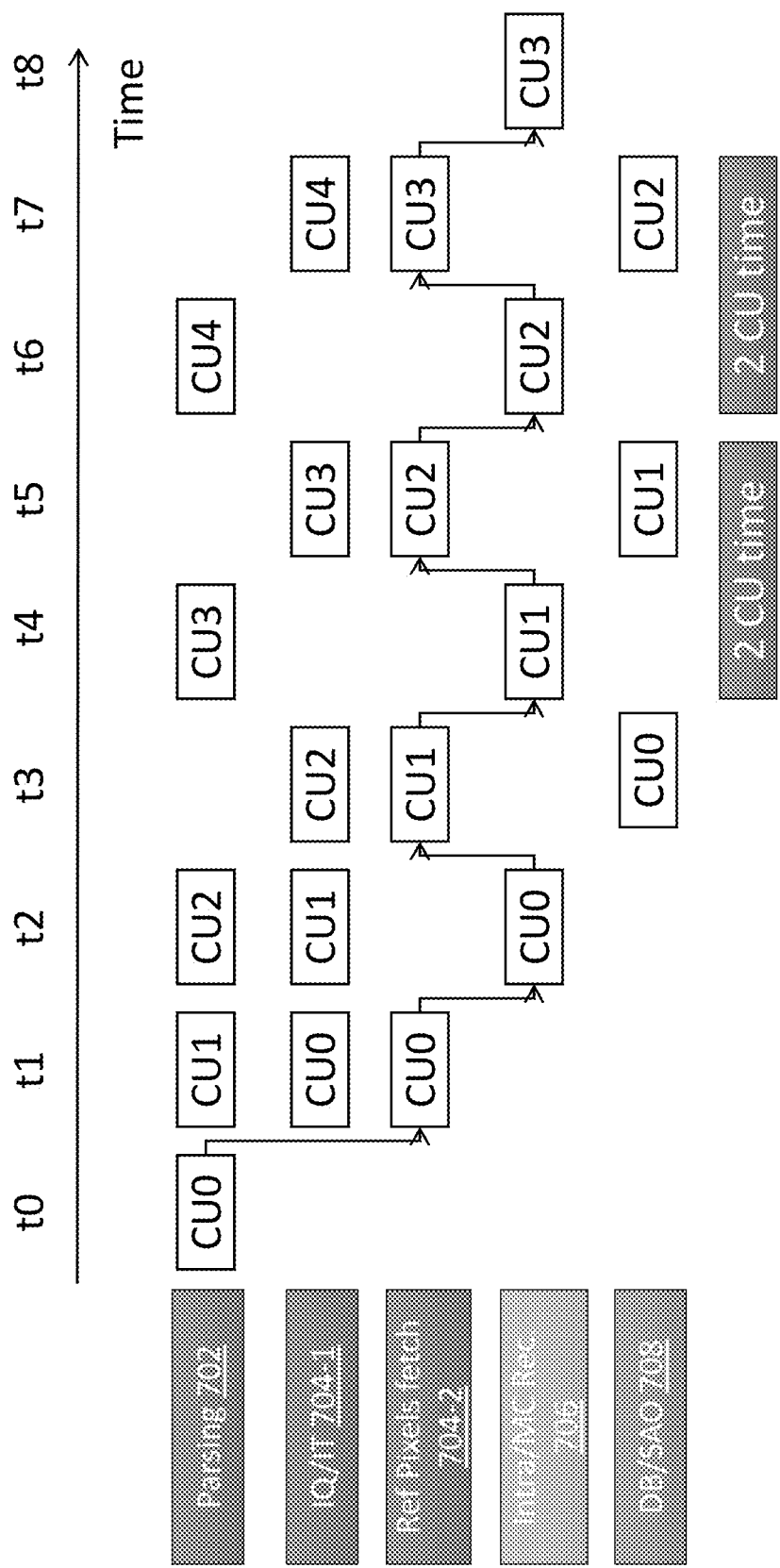
FIG. 8 shows an example of a decoder pipeline execution when executing a decoder-side predictor refinement tool.

FIG. 8 shows an example of a decoder pipeline execution when executing a decoder-side predictor refinement tool. For example, and using PMVD as an example, at time t2, since the MVs for CU0 depend on the PMVD searching process in the Intra/MC Reconstruction stage 706 (which is also performed at t2), the MVs cannot be reconstructed in the Parsing stage 702 for CU01 (at time t1), and so the data cannot be pre-fetched for CU1 at t2 at stage Ref Pixels fetch 704-2. This problem similarly affects the processing of each CU, and therefore results ultimately in only one CU processing finishing per two time slots. For example, FIG. 8 shows that for t4 and t5, the decoder only completes processing CU1, compared to FIG. 7, where CU1 completes processing at t4 and CU2 completes processing at t5.

Data pre-fetch issues can be addressed when decoder-side prediction refinement techniques (e.g., PMVD) are used for decoding. For example, the techniques allow the data to be pre-fetched in a manner that still hides the latency cycles, such as shown in FIG. 7, rather than causing a delay as shown in FIG. 8. For ease of illustration, the discussion below refers to PMVD as an example, although a person of skill can appreciate that the techniques can be adapted for other decoder-side prediction refinement techniques (e.g., BIO and DMVR).

According to some embodiments, the original candidate MV is preserved in the MV buffer for the next decoding process. In some examples, the selected merge candidate MVs (e.g., the starting, or unrefined MVs) are stored back to the MV buffers so that the decoder can reference the neighboring blocks and the collocated blocks/pictures. Therefore, according to some examples, the MC of the PMVD block (e.g., performed at the Intra/MC Reconstruction stage 706) uses the PMVD derived MVs, but the selected merge candidate MVs are stored back to the MV buffers for the future referencing. This can allow, for example, the MVs to be reconstructed in Parsing stage 702, and the reference pixels can be pre-fetched at stage 704-2. If the current block is a PMVD coded block, a larger reference block (e.g., including the refinement search range) can be pre-fetched. Therefore, in some examples, the MV is not refined for the current block, but the decoder uses the refined MV for compensation.

In some examples, the decoder can be configured not to change the MV in the MV buffer. For example, the decoder can store the starting point (e.g., the starting MV(s)) in the MV buffer, and do the refinement to generate a refinement MV that is only used to generate motion compensation data, without changing the MV in the MV buffer. The MV buffers for the future referencing (e.g. the merge candidate list and AMVP candidate list generation) is not changed.

In some examples, the decoder can use a separate buffer for refinement. For example, the decoder can retrieve the starting MV, run PMVD and execute refinement without storing the refined MV in the original MV buffer—the decoder stores the refined MV in a temporal buffer.

In some examples, the decoder can signal a starting candidate for PMVD. For example, the decoder can signal a starting candidate index that is used to select a starting MV from a MV candidate list. This can be done, for example, so that the decoder knows which candidate out of the eleven candidates will be used as the starting candidate for PMVD. The decoder can first generate the eleven starting candidates, and the encoder can signal to the decoder which is best. This signaling can allow, for example, the decoder to skip template matching and to proceed right to the refinement since the decoder knows staring candidate (e.g., the decoder can perform refinement using template matching and the Diamond Search technique to refine the MV around the starting candidate). While the MV is will be refined by diamond search, in proposed method will only store the starting candidate, not the refined motion vector.

In some examples, for PMVD (e.g., including bilateral matching merge mode and template matching merge mode) the LIST_0 and LIST_1 MVs in merge candidates are used as starting MVs. In some examples, a best MV candidate can be implicitly derived by searching all these MVs. This can require a lot of memory bandwidth. In this example, the merge index for bilateral matching merge mode or template matching merge mode is signaled. The signaled merge index can indicate, for example, the best starting MVs in LIST_0 and LIST_1 in template matching merge mode, and the best two MV pairs (one is derived from the LIST_0 and the other is derived from the LIST_1) in bilateral matching merge mode. By signaling the merge index, the template matching step can be limited to, e.g., a refinement search around the signaled merge candidate. For bilateral matching, the decoder can perform cost estimation to select the best MV pair from the two MV pairs and perform the refinement search. For bilateral matching, if the merge candidate is a uni-directional MV, its corresponding MV in another list can be generated by using the mirrored (scaled) MV. In some embodiments, by using a predefined MV generating method, the starting MVs in LIST_0, LIST_1, and/or the MV pairs are known. The best starting MVs in LIST_0 and/or LIST_1, or the best MV pair are explicitly signaled to reduce the bandwidth requirement.

In some examples, when one merge index is signaled, the decoder can further utilize the selected MV to exclude or select some candidates in the first stage (PU-level Matching). For example, the decoder can exclude some MVs in the candidate list which are far from the selected MVs. As another example, the decoder can pick N MVs in the candidate list that are the most close to the selected MV but in different reference frames.

As explained herein, some techniques provide for signaling the starting MV (e.g., to signal the starting candidate, such as described above for PMVD) by generating a starting MV candidate list and signaling a candidate index. Using PMVD as an example, since PMVD performs the MV refinement, two similar starting MV candidates might have the same refined final MV. Thus, the similar MVs in the candidate list generation can be removed from the candidate list, or pruned, since they might have the same refined final MV since PMVD searches for a local minimum around the starting candidate.

Figure 16A:
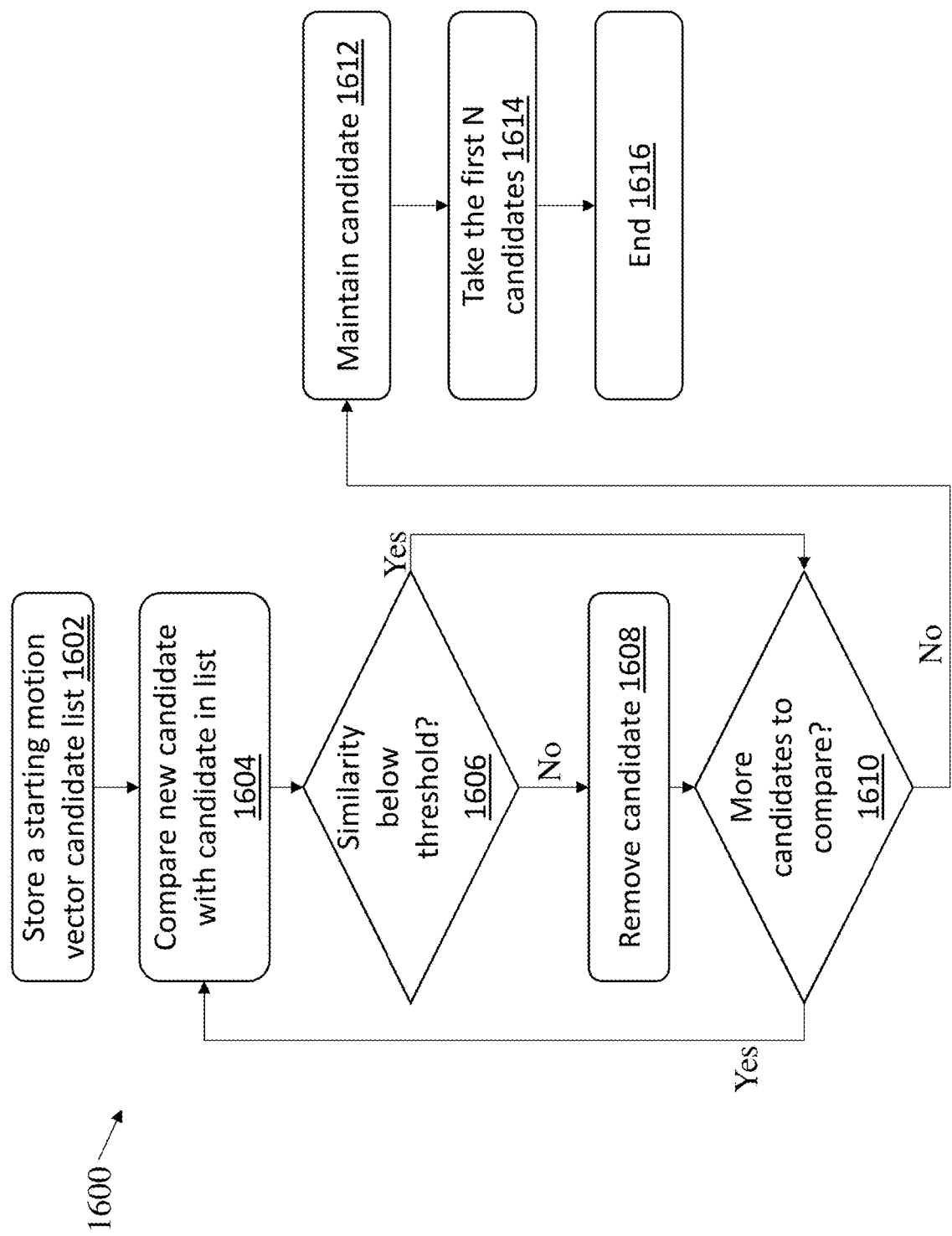
FIG. 16A shows an exemplary method for pruning a motion vector candidate list, according to some embodiments.
Figure 16B:
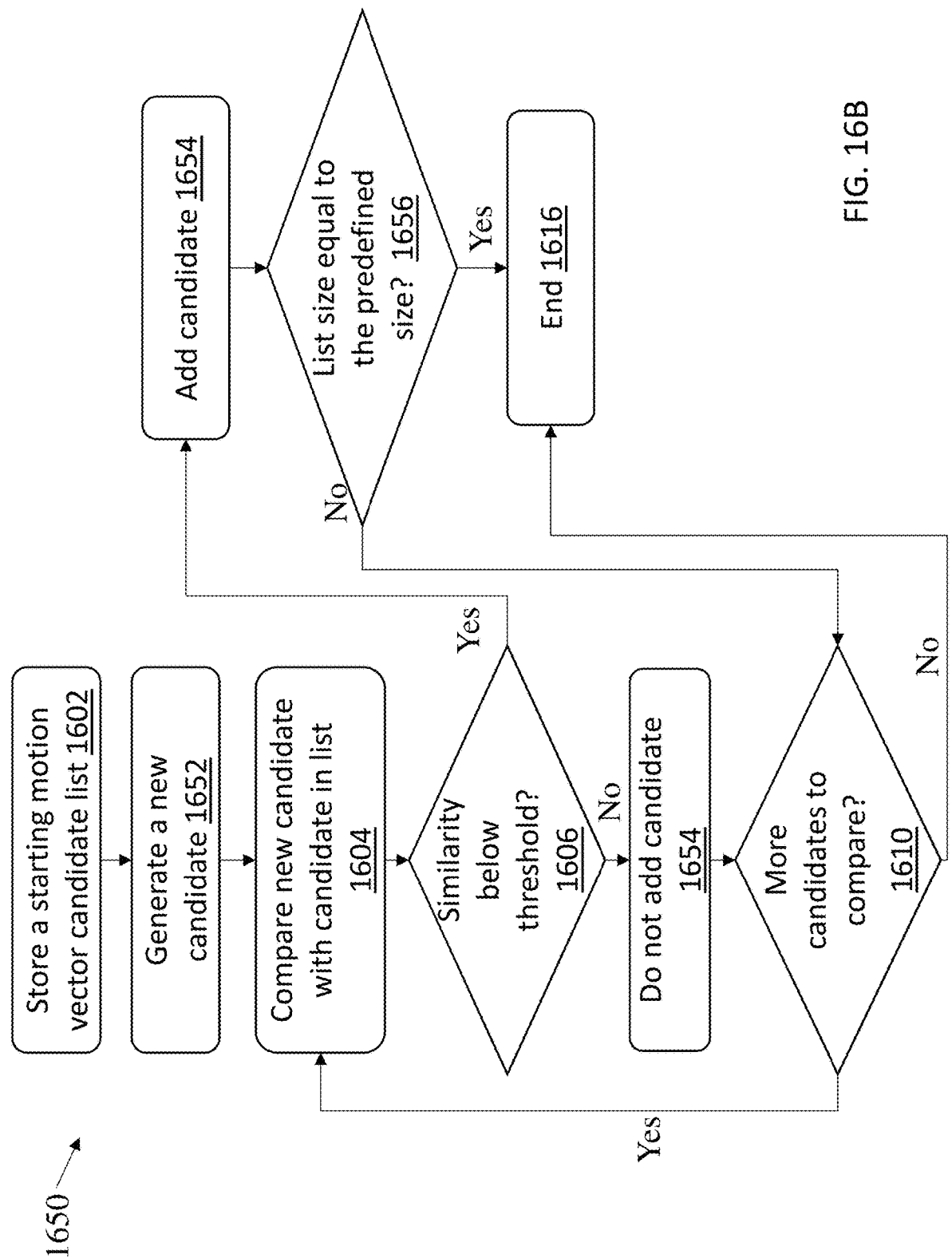
FIG. 16B shows an exemplary method for generating a motion vector candidate list, according to some embodiments.

A motion vector candidate list can be pruned and/or created using the techniques described herein. FIG. 16A shows an exemplary method 1600 for pruning a motion vector candidate list, according to some embodiments. FIG. 16B shows an exemplary method 1650 for creating a motion vector candidate list, according to some embodiments. For example, the list may be empty first, and whenever a new candidate may be added, the techniques can determine whether the new candidate is redundant or not with any existing motion vector candidates in the list. If it is redundant, then the new candidate is not added.

Referring to FIG. 16A, at step 1602, the decoder stores a starting motion vector candidate list. For example, the traditional merge candidate list generation process (e.g., described above) can be used to generate the PMVD merge candidate list. Referring to steps 1604-1610 in FIG. 16A, for MV derivation a newly added MV can be compared with the MVs that are already in the candidate list. If one (or more) of the MVs is similar to the newly added MV, the newly added MV will be removed from the list. In particular, at step 1604 the decoder compares the new candidate with an existing candidate in the candidate MV list to determine a similarity of the candidates. At step 1606 the decoder compares the similarity to a predetermined threshold. If the similarity is not below the predetermined threshold, the decoder removes the candidate at 1608 (and proceeds to step 1610). Otherwise, if the similarity is below the predetermined threshold, the method proceeds to step 1610. At step 1610 if there are more candidates in the candidate MV list to check, the method 1600 iterates back to step 1604 for each remaining candidate in the candidate list. Otherwise, if all MV candidates in the MV candidate list have been compared to the new candidate (and each comparison has been above the threshold at step 1606), at step 1612 the decoder maintains the new MV candidate in the MV candidate list. At step 1614, method 1600 takes the first "N" candidates in the starting motion vector candidate list. The value of N can be a predetermined value. N can be used to ensure that the ultimate list size is below a predetermined maximum size. In some examples, if the starting motion vector candidate list has less than N candidates, then step 1614 does not modify the starting motion vector candidate list. Method 1600 proceeds to step 1616 and ends.

Referring to FIG. 16B, method 1650 includes some similar steps as method 1600 in FIG. 16A, including steps 1602, 1604, 1606, 1610, and 1616, as discussed further below. At step 1602, the decoder stores a starting motion vector candidate list. For example, the starting motion vector candidate list may be empty. At step 1652, the decoder generates a new motion vector candidate. At step 1604, the decoder compares the new candidate with an existing candidate in the starting MV candidate list to determine a similarity of the candidates. In some examples, if there are not yet any candidates in the starting MV candidate list, while not shown method 1650 can proceed directly to step 1654 and add the candidate to the starting MV candidate list. At step 1606 the decoder compares the similarity to a predetermined threshold. If the similarity is not below the predetermined threshold, the decoder proceeds to step 1654 and does not add the new MV to the list (and proceeds to step 1610). If the similarity is below the predetermined threshold, method 1650 proceeds to step 1654 and adds the candidate to the list. From step 1654, the method 1650 proceeds to step 1656 and determines whether the list size is equal to a predetermined size. If not, the method proceeds to step 1610. Otherwise, the method proceeds to step 1616 and ends. At step 1610 if there are more candidates to check, the method 1650 iterates back to step 1604 for each remaining candidate. Otherwise, method 1650 proceeds to step 1616 and ends.

In some embodiments, the similarity of the MV can be determined based on whether (a) the reference frame indices (or POC) are the same, and/or (b) the MV difference is smaller than a threshold. For example, the sum of absolute MV distance of MVx and MVy can be calculated using Equation 1:

$$\text{abs}(MVx0-MVx1)+\text{abs}(MVy0-MVy1)<K; \qquad \text{Equation 1:}$$

where K is a pixel distance such as, for example, a half pixel, one integer pixel, two integer pixels, three integer pixels, three and a half integer pixels, etc.

As another example, the absolute MV distance of MVx and absolute MV distance of MVy can be compared against K, using Equation 2 below:

$$\text{abs}(MVx0-MVx1)<K \;\&\&\; \text{abs}(MVy0-MVy1)<K; \qquad \text{Equation 2:}$$

where K, like with equation one, can be a half pixel, one integer pixel, two integer pixels, three integer pixels, three and a half integer pixels, etc.

Figure 14:
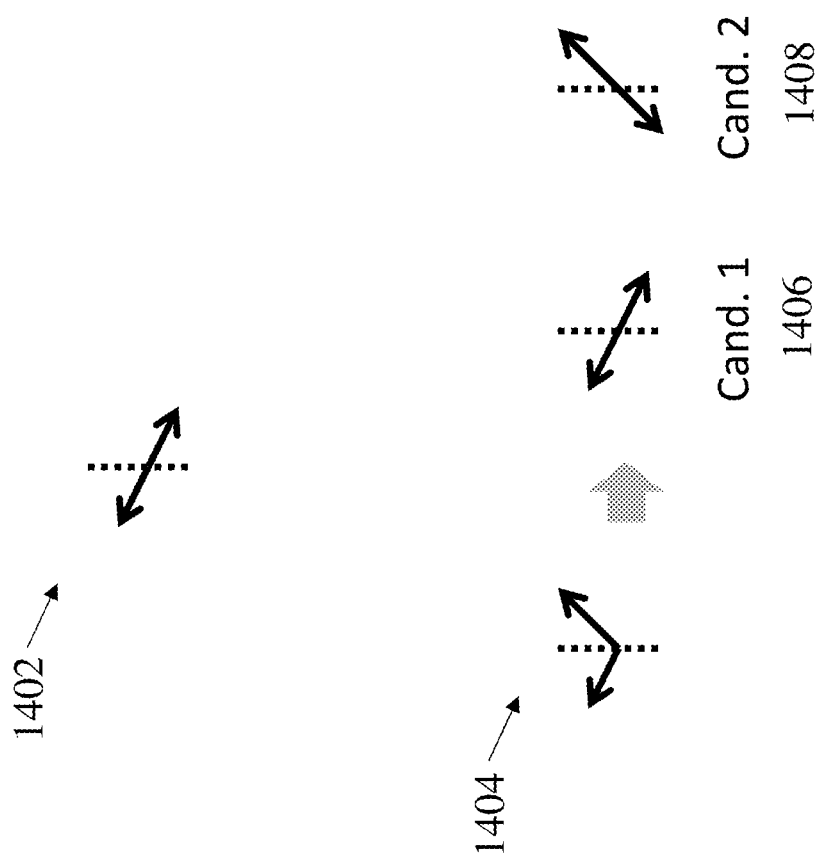
FIG. 14 shows an example of candidate MV pairs in the same motion trajectory and not in the same motion trajectory, according to some embodiments.

In some embodiments, e.g., for bilateral matching merge mode, the candidate MV pair can be checked to determine whether they are in the same motion trajectory. For example, the original merge candidate MV can be checked to determine whether the MVs in LIST_0 and LIST_1 are in the same motion trajectory. FIG. 14 shows an example of whether candidate MV pairs are in the same motion trajectory, according to some embodiments. If the MVs in LIST_0 and LIST_1 are in the same motion trajectory as shown in 1402, the candidate MV is added into the list; otherwise, if the MVs in LIST_0 and LIST_1 are not in the same motion trajectory as shown in 1404, the MVs of LIST_0 and LIST_1 are separated into two candidate MVs. For each of the two separated candidate MVs, the missing list MV is filled with the mirrored MV of the other list as shown by 1406 and 1408. As another example, each bi-prediction MV candidate is separated into two candidates. One candidate is the LIST_0 MV, and the other is the LIST_1 MV. Then, each candidate (e.g., each un-predicted candidate) is used to generate the missing list MV by filling the missing list MV with the mirrored MV of the valid list.

In PMVD MV searching, a MV search method can be predefined (e.g., a three step diamond search). For example, for a diamond search, the step size of the first step diamond search is half of one pixel (half-pixel). The step size of the second step cross search is one quarter of one pixel (quarter-pixel). The step size of the third step cross search is ⅛ of one pixel (⅛ pixel). In some embodiments, both (a) the merge index of the staring MV and (b) a coarse grain MVD are signaled. The MVD can be the refinement position index of the first step diamond search, and/or a conventional MVD. The MVD unit can be 1/16-pixel, ⅛-pixel, quarter-pixel, half-pixel, one-pixel, two-pixel, or any predefined unit. The MVs of the selected merge index plus the signaled MVD (or the MV of the refinement position) can be used as the PMVD starting MV, which are stored into the MV buffer for merge candidate and AMVP candidate derivation referencing. In some examples, for the encoder and/or the decoder, the PMVD search can start from the PMVD starting MV. The final PMVD derived MV is only for the MC. The starting MVs of the PMVD coded block can be reconstructed in parsing stage.

In some examples, only one MVD, and/or only one MVD refinement position index, is signaled. If the merge candidate is a bi-predicted candidate, the MVD is added only on the LIST_0 or LIST_1. For bilateral matching merge mode, if the MVD is added on the LIST_0, the LIST_1 starting MV can be the mirrored MV of the LIST_0 starting MV.

In some examples, coarse grain MVD is not coded but derived in the search process at decoder. For example, we can partition the search process into three stages, the first step diamond search, the second step cross search, and the third step cross search. The coarse grain MVD can be the result of search process in the first step diamond search or the second step cross search.

In HEVC, a picture is divided into coding tree units (CTUs), which are the basic processing unit for HEVC. The CTUs are coded in raster scan order. In a pipelined decoder architecture, most information of the upper CTU rows is available in parsing stage (e.g., including the MV information) since the row was already processed. In some examples, the decoder-side derived MVs in CTUs from the upper CTU-row can be referenced (or used), for example, for merge candidate list and AMVP list generation, since the information is available in the parsing stage. The decoder can use the derived MVs in those CTUs even though the decoder-side derived MVs in current CTU-row cannot be used since they are not available.

Therefore, in some embodiments a CTU-row constraint can be used with the techniques described herein, such that the PMVD derived MVs in upper CTU-row can be referred to (e.g. when not referring to the MV of the PMVD coded block) or can be used (e.g. when storing the merge candidate MVs, storing the merge candidate MVs and mirrored MV, sending the merge index for PMVD and bilateral mirrored MV (and only evaluating one MV), signaling the merge index and coarse grain MVD, and/or AMVP mode and PMVD).

For example, consider the techniques discussed herein regarding when storing the merge candidate MVs, storing the merge candidate MVs and mirrored MV, and sending the merge index for PMVD and bilateral mirrored MV (and only evaluating one MV). When referring to the PMVD coded blocks in current CTU-row, the selected merge candidate MVs can be used for merge candidate derivation and AMVP candidate derivation. When referring to the PMVD coded blocks in upper CTU-row, the final PMVD derived MVs can be used.

As another example, consider the techniques discussed herein regarding not referring to the MV of the PMVD coded block. When referring to the PMVD coded blocks in current CTU-row, the MVs are not available for merge candidate derivation and AMVP candidate derivation. When referring to the PMVD coded blocks in upper CTU-row, the final PMVD derived MVs are used.

The CTU-row constraint can be changed to CTU constraint or any predefined or derived area constraint. For example, when not referring to the MV of the PMVD coded block, if the CTU constraint is applied, the MVs of PMVD coded blocks in the current CTU are not available while the MVs of the PMVD coded blocks in different CTUs are available.

Overlapped block motion compensation (OBMC) is a coding tool that can be used to reduce block artifacts in motion compensation. An example of how OBMC is performed at block boundaries as described in JVET-F1001, entitled "Algorithm Description of Joint Exploration Test Model 6 (JEM 6)," which is hereby incorporated by reference herein in its entirety. For ease of illustration, the description that follows references JVET-F1001, but this description is not intended to be limiting.

Figure 11:
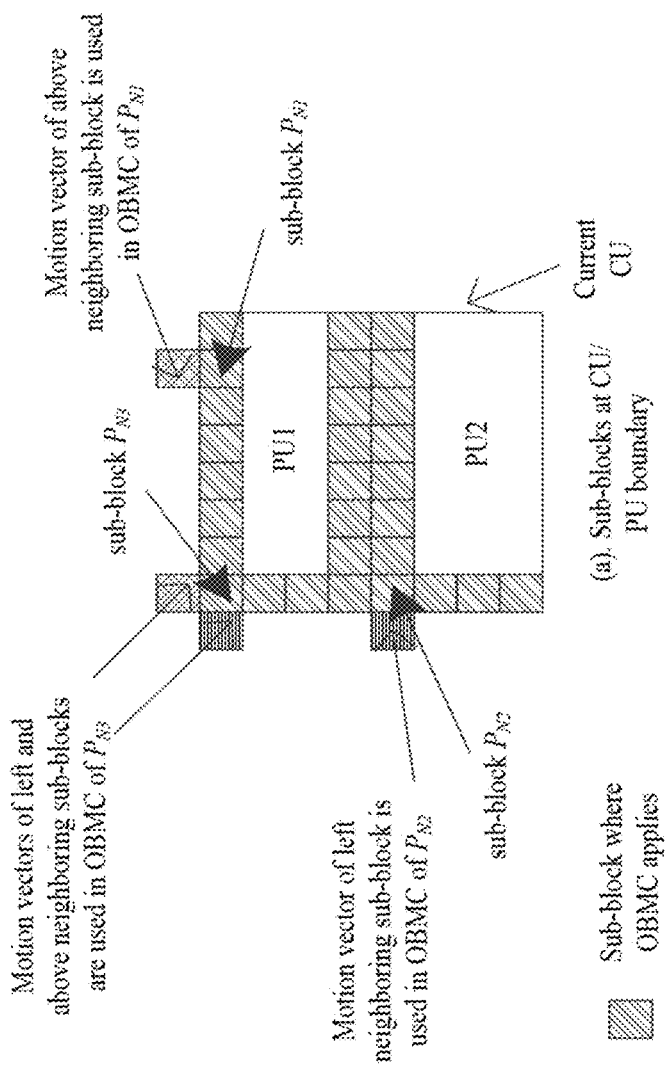
FIG. 11 is a diagram that illustrates overlapped block motion compensation (OBMC) performed at the sub-block level for motion compensation (MC) block boundaries.

For OBMC, in some examples, the neighboring block is compensated by the MV of the current block. As shown in FIG. 11, which is an excerpt of FIG. 14 in section 2.3.4 of JVET-F1001, OBMC is performed at the sub-block level for all motion compensation (MC) block boundaries, where the "sub-block" size is set equal to 4×4. JVET-F1001 explains that when OBMC is applied to the current sub-block, besides current motion vectors, motion vectors of four connected neighboring sub-blocks, if available and if not identical to the current motion vector, are also used to derive the prediction block for the current sub-block. These multiple prediction blocks are based on multiple motion vectors that are combined to generate the final prediction signal of the current sub-block.

Figure 12A:
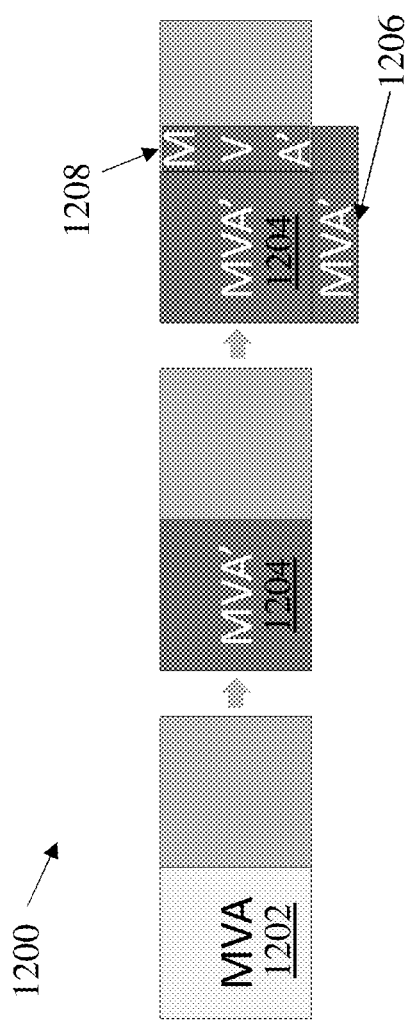
FIG. 12A shows an exemplary high level summary of the OBMC method.

JVET-F1001 further explains that the prediction block based on motion vectors of a neighboring sub-block is denoted as $P_N$, with N indicating an index for the neighboring above, below, left and right sub-blocks and prediction block based on motion vectors of the current sub-block is denoted as $P_C$. When $P_N$ is based on the motion information of a neighboring sub-block that contains the same motion information to the current sub-block, OBMC is not performed from $P_N$. Otherwise, every sample of $P_N$ is added to the same sample in $P_C$, namely four rows/columns of $P_N$ are added to $P_C$. The weighting factors {¼, ⅛, 1/16, 1/32} are used for $P_N$ and the weighting factors {¾, ⅞, 15/16, 31/32} are used for $P_C$. The exceptions are small MC blocks, (when height or width of the coding block is equal to 4 or a CU is coded with sub-CU mode), for which only two rows/columns of $P_N$ are added to $P_C$. In this case weighting factors {¼, ⅛} are used for $P_N$ and weighting factors {¾, ⅞} are used for $P_C$. For $P_N$ generated based on motion vectors of vertically (horizontally) neighboring sub-block, samples in the same row (column) of $P_N$ are added to $P_C$ with a same weighting factor. FIG. 12A shows an exemplary high level summary of OBMC method 1200. MVA 1202 represents the original MV. Using a decoder-side predictor technique, MVA 1202 is refined to MVA' 1204. MVA' 1204 is used for OBMC at the block boundaries, resulting in blended sections 1206 and 1208 based on MVA' 1204.

Figure 12B:
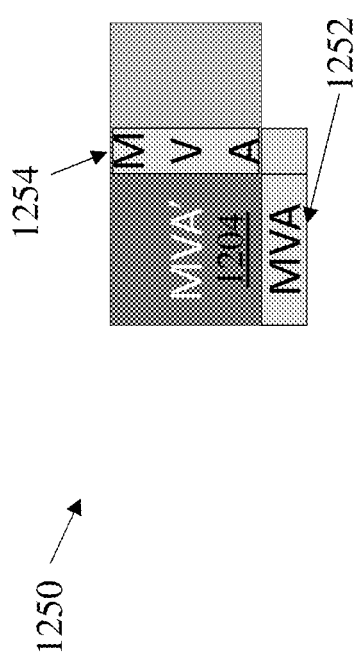
FIG. 12B shows an exemplary high level summary of the OBMC method when using a staring MV.

As described herein, techniques are provided for allowing similar execution timing of decoder-side predictor refinement techniques as compared to the execution of traditional decoding methods. For example, some embodiments include using the starting MV (not the refined MV) or the partial refined MV (starting MV+signaled MV offset) to reference the neighboring block in the parsing stage and the pre-fetch stage (e.g., stages 602 and 604 in FIG. 6). In some embodiments, such techniques can result in using the starting MV for other processing, such as deblocking, OBMC, and temporal collocated MV derivation. Using the starting MV for other such processing may introduce blocking artifacts. For example, some blocking artifacts might be found when OBMC and/or deblocking use a restored MV, such that OBMC or deblocking is not performed using refined MVs. FIG. 12B shows an exemplary result 1250 of applying OBMC using the staring MV 1202 (e.g., a restored MV). Unlike in FIG. 12A, with blended sections 1206 and 1208 based on MVA' 1204, blended sections 1252 and 1254 in FIG. 12B are based on MVA 1202. This can cause, for example, a block artifact since the neighboring block is MVA' 1204 but the MV used for blending is MVA 1202.

Figure 15:
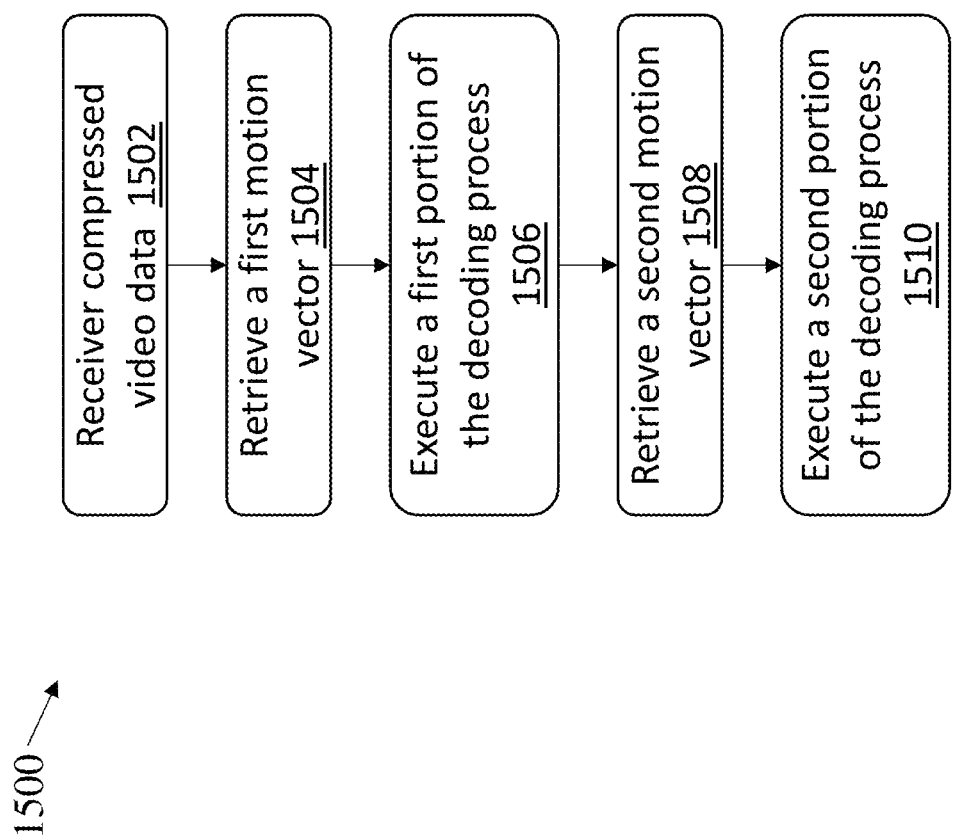
FIG. 15 shows an exemplary decoding method for decoding video data using two MVs, according to some embodiments.

To address such post-parsing processing issues, multiple MVs can be used. FIG. 15 shows an exemplary decoding method 1500 for decoding video data that uses two MVs, according to some embodiments. At step 1502, the decoder receives compressed video data related to a set of frames. At steps 1504-1510, the decoder calculates, using a decoder-side predictor refinement technique, a new motion vector for a frame from the set of frames. In particular, at step 1504, the decoder retrieves (e.g., from a first buffer) a first motion vector (e.g., an unrefined MV) associated with the current frame. At step 1506, the decoder executes a first portion of the decoding process (e.g., the parsing stage, a MV/MVP derivation, and/or a MV refinement technique) using the first motion vector. At step 1508, the decoder retrieves a second motion vector (e.g., from a second buffer) associated with the current frame (e.g., a refined MV). At step 1510, the decoder executes a second portion of the decoding process (e.g., the reconstruction stage, the motion compensation portion, a deblocking portion, and/or OBMC) using the second motion vector.

Referring to steps 1504-1510, in some embodiments two sets of MVs can be used: (1) a first set of MVs used for the parsing stage (e.g., parsing stage 702 in FIG. 7), including for MV/MVP derivation and/or pixel pre-fetch, and (2) a second set of MVs for reconstruction (e.g., during Intra/MC Rec. stage 706 in FIG. 7), including for motion compensation, OBMC and/or deblocking. The first set of MVs can store the original (unrefined) MV, and the second set of MVs can store the refined MV. Such techniques can facilitate, for example, OBMC and/or deblocking to use the modified MV. Using the modified MV can avoid additional blocking artifacts (e.g., such as which could be caused by running OBMC and/or deblocking using unrefined MVs) and/or can provide a better coding gain compared to using unrefined MVs.

For example, to handle potential blocking artifacts, an individual unrefined MV set can be used in the parsing stage (e.g., for merge candidate list generation and/or AMVP candidate list generation). According to some examples, the MVs in the unrefined MV set are not refined by a decoder-side MV refinement tool, and can be used for MV parsing and MV reconstruction. Then the reconstructed MVs are used for reference pixel fetching. The MVs refined by a decoder-side MV refinement tool can be stored in another MV buffer set. The refined MVs can be used for motion compensation, OBMC, deblocking, and/or other tools that won't change the parsing process according to the MVs.

Since the MVs in other previously-refined pictures are already refined, using the refined MVs in these other pictures will not introduce the prefetch issue described above in conjunction with FIG. 8. In some embodiments, the refined MV set can be used for temporal MV derivation in the parsing stage and the MV reconstruction stage. For example, for merge candidate list generation and AMVP candidate list generation, when deriving the spatial neighboring MVs, the unrefined MV set is used, while when deriving the temporal collocated MVs, the refined MV set is used.

The MVs in upper CTU rows may already be refined, as discussed above. In some embodiments, the first MV set (e.g., used for the parsing stage) can store the MVs of the second MV set (e.g., used for reconstruction) if the MV is in the upper CTU row. For example, if the MV is in the upper CTU row, then the parsing stage can access the second MV set for the upper CTU row. This can, for example, reduce the unrefined MV buffer size. For example, the buffer size can be reduced by only needing to keep the MV of one block row of a CTU and one block column of a CTU. The MVs that will not be referred to by the neighboring spatial blocks in the current CTU row in the parsing stage and MV reconstruction stage (e.g. for merge candidate list generation and AMVP candidate list generation) can be discarded. Thus, in some embodiments, only the refined MVs need to be stored. In the hardware implementation, the unrefined MVs can be stored just in the parsing pipeline stage and the pre-fetch pipeline stage (e.g., stages 702 and 704-2 in FIG. 7). In some embodiments, the techniques can use the refined MVs from the CUs that were processed before the N previous CUs. For example, if we think CUs before the last 5 decoded CU are ready to be used (e.g., without introducing prefetch issues), the MV in the CUs before the last 5 decoded CU can use the refined MV. In some embodiments, the same concept can be applied for the tile/slice boundary. For example, if the reference MV is in different tile or different slice, then the parsing stage can access the second MV set for the MV in different tile or different slice.

Figure 13:
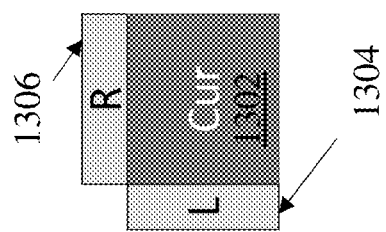
FIG. 13 illustrates a high-level depiction of the MV set for the current CTU, the left column, and the above row.

Regarding the first MV set used for the parsing stage, the first MV set (the unrefined MVs) can be used for Merge/AMVP candidate generation and/or starting MV generation. The generated MV is used for reference pixel fetching. In some embodiments, if the CTU row constraint is not applied, the MV set contains (a) the unrefined MV of the current picture (e.g., the left column, above row, and cur CTU), and (b) the refined MV of the other picture (e.g., the temporal collocated picture). For example, referring to FIG. 13, the MV set contains the unrefined MV of the current picture for the current CTU 1302, the left column 1304, and the above row 1306. In some embodiments, if CTU row constraint is applied, the MV set contains (a) the unrefined MV of the current CTU row (left column and cur CTU), (b) the refined MV of upper CTU row (above row), and (c) the refined MV of the other picture. For example, referring to FIG. 13, the MV set contains the unrefined MV of the current CTU row for the cur CTU 1302 and the left column 1304, and the refined MV of upper CTU row for the above row 1306.

Regarding the second MV set used for the reconstruction stage, the second MV set can be used for motion compensation, OBMC and/or deblocking. The second MV set contains (a) the refined MV of the current picture, and (b) the refined MV of the other picture. For example, referring to FIG. 13, the MV set contains the refined MV of the current picture for the cur CTU 1302, the left column 1304, and the above row 1306.

The proposed multiple MVs/MV sets method can be also applied in the encoder. For example, an individual unrefined MV set can be used in the syntax encoding stage, MV derivation, and/or MVP derivation (e.g. merge candidate list generation, and/or AMVP candidate list generation). According to some examples, the MVs in the unrefined MV set are not refined by a decoder-side MV refinement tool, and can be used for MV encoding and MVP generation. The MVs refined by a decoder-side MV refinement tool can be stored in another MV buffer set. The refined MVs can be used for motion compensation, OBMC, deblocking, and/or other tools that won't change the parsing process according to the MVs.

Again, to recap, decoder-side MV refinement tools (e.g. PMVD, DMVR, and BIO) may change the MV of a block (e.g., which can result in a parsing issue or reference pixel pre-fetch issue as discussed above). In some embodiments, when storing the refined MV back, the difference between refined MV and the starting MV can be constrained to a pre-defined threshold. For example, if the difference between the refined MV and the starting MV is larger than the predetermined threshold (e.g., 4, 8, or 16 integer pixel distance), then the refined MV is first clipped (e.g., set just below, or equal to, the threshold) and then stored as the clipped MV. For example, the MV can be clipped by starting MV±4, 8, or 16 integer pixel. If the difference between refined MV and the starting MV is smaller than this threshold, the refined MV can be stored directly.

The impact of a decoder-side MV refinement tool changing the MV of a block can be reduced by removing the pruning process between these refined MVs and other MVs in the MV/MVP derivation (e.g., in merge candidate list reconstruction or AMVP list reconstruction). For example, in some embodiments, the pruning process used to remove the redundancy among possible candidates is only applied on those MVs which are not refined at decoder. For those candidates which may be refined at the decoder, the refined MVs can be directly added into the candidate list without using the pruning process. In some embodiments, eliminating such pruning can be combined with the other techniques described above (e.g. the refined MV clipping and the multiple MVs/MV sets) to further reduce the impact.

In some embodiments, OBMC is applied in the reconstruction stage (e.g., stage 606 in FIG. 6). Therefore, two different techniques can be used for OBMC (either alone or in combination, such as using different techniques for sub-blocks along different edges). The first technique is to use the starting MV or the partial refined MV (e.g. the unrefined MV) that is stored in the MV buffer for OBMC. The second technique is to use the decode-side refined MV (e.g. the refined MV) for OBMC.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A decoding method for decoding video data, the method comprising:
    receiving compressed video data related to a set of frames;
    deriving a first unrefined motion vector from a motion vector candidate list; and
    calculating, using a decoder-side predictor refinement technique according to the first unrefined motion vector, a refined motion vector for the current coding unit of a current frame from the set of frames, wherein the refined motion vector estimates motion for the current coding unit based on one or more reference frames from the set of frames, comprising:
        retrieving, for the current coding unit, a first motion vector of a previous coding unit being processed before the current coding unit, wherein the first motion vector is an unrefined motion vector that is used to determine a corresponding final refined motion vector for the previous coding unit, and wherein the unrefined motion vector is not used to perform prediction of the previous coding unit, but the final refined motion vector is used to the perform prediction of the previous coding unit;
        retrieving a second motion vector associated with a first collocated frame, wherein the second motion vector is a refined motion vector;
        executing a first portion of a decoding process for the current coding unit using the first motion vector and the second motion vector, wherein the first portion of a decoding process comprises a motion vector candidate list generation, and wherein the motion vector candidate list generation comprises motion vector prediction derivation, merge candidate derivation, or both, wherein:
            deriving a spatially neighboring motion vector for the motion vector candidate list generation comprises using the unrefined motion vector of the previous coding unit that is not used to perform the prediction of the previous coding unit and adding the unrefined motion vector to the motion vector candidate list if the unrefined motion vector is not similar with respect to a threshold to one or more candidates with the motion vector candidate list; and deriving a temporal collocated motion vector for the motion vector candidate list generation comprises using the refined motion vector; and executing a second portion of the decoding process for the current coding unit using the refined motion vector, wherein the second portion of the decoding process comprises performing motion compensation;

the first motion vector, which is the unrefined motion vector of the current coding unit, is used as a motion vector for the neighboring coding unit being processed after the current coding unit, and the refined motion vector of the current coding unit is used as a motion vector for one or more frames being processed after the current frame.

2. The decoding method of claim 1, wherein:
the second motion vector is refined using a decoder-side predictor refinement technique that refines the first motion vector;
the first portion of the decoding process comprises a parsing portion, a motion vector derivation portion, or both; and
the second portion of the decoding process comprises a reconstruction portion.

3. The decoding method of claim 1, wherein executing the first portion of the decoding process comprises referring to the first motion vector as a decoded motion vector of the current coding unit.

4. The decoding method of claim 1, further comprising:
determining whether a coding tree unit constraint is applied to the compressed video data.

5. The decoding method of claim 1, further comprising retrieving:
an unrefined motion vector of a current coding tree unit row;
a refined motion vector of an upper coding tree unit row, other tile, or other slice; and
an additional refined motion vector associated with a second coding unit.

6. An apparatus configured to decode video data, the apparatus comprising a processor in communication with memory, the processor being configured to execute instructions stored in the memory that cause the processor to:
receive compressed video data related to a set of frames;
deriving a first unrefined motion vector from a motion vector candidate list; and
calculate, using a decoder-side predictor refinement technique according to the first unrefined motion vector, a refined motion vector for the current coding unit of a current frame from the set of frames, wherein the refined motion vector estimates motion for the current coding unit based on one or more reference frames from the set of frames, comprising:
retrieving, for the current coding unit, a first motion vector of a previous coding unit being processed before the current coding unit, wherein the first motion vector is an unrefined motion vector that is used to determine a corresponding final refined motion vector for the previous coding unit, and wherein the unrefined motion vector is not used to perform prediction of the previous coding unit, but the final refined motion vector is used to the perform prediction of the previous coding unit;

retrieving a second motion vector associated with a first collocated frame, wherein the second motion vector is a refined motion vector;

executing a first portion of a decoding process for the current coding unit using the first motion vector and the second motion vector, wherein the first portion of a decoding process comprises a motion vector candidate list generation, and wherein the motion vector candidate list generation comprises motion vector prediction derivation, merge candidate derivation, or both, wherein:

deriving a spatially neighboring motion vector for the motion vector candidate list generation comprises using the unrefined motion vector of the previous coding unit that is not used to perform the prediction of the previous coding unit and adding the unrefined motion vector to the motion vector candidate list if the unrefined motion vector is not similar with respect to a threshold to one or more candidates with the motion vector candidate list; and deriving a temporal collocated motion vector for the motion vector candidate list generation comprises using the refined motion vector; and executing a second portion of the decoding process for the current coding unit using the second refined vector, wherein the second portion of the decoding process comprises performing motion compensation;

the first motion vector, which is the unrefined motion vector of the current coding unit, is used as a motion vector for the neighboring coding unit being processed after the current coding unit, and the refined motion vector of the current coding unit is used as a motion vector for one or more frames being processed after the current frame.

7. The apparatus of claim 6, wherein:
the second motion vector is refined using a decoder-side predictor refinement technique that refines the first motion vector;
the first portion of the decoding process comprises a parsing portion, a motion vector derivation portion, or both; and
the second portion of the decoding process comprises a reconstruction portion.

8. The apparatus of claim 6, wherein executing the first portion of the decoding process comprises referring to the first motion vector as a decoded motion vector of the current coding unit.

9. The apparatus of claim 6, wherein the processor is configured to execute instructions stored in the memory that cause the processor to determine whether a coding tree unit constraint is applied to the compressed video data.

10. The apparatus of claim 6, wherein the processor is configured to execute instructions stored in the memory that cause the processor to retrieve:
an unrefined motion vector of a current coding tree unit row;
a refined motion vector of an upper coding tree unit row, other tile, or other slice; and
an additional refined motion vector associated with a second coding unit.

* * * * *